US012273045B2

(12) United States Patent
Fujiwara et al.

(10) Patent No.: US 12,273,045 B2
(45) Date of Patent: Apr. 8, 2025

(54) POWER CONVERSION DEVICE WITH INDIVIDUAL CELL AND ARM BALANCING

(71) Applicant: Mitsubishi Electric Corporation, Tokyo (JP)

(72) Inventors: Shuhei Fujiwara, Tokyo (JP); Yoshiyuki Kono, Tokyo (JP); Ryosuke Uda, Tokyo (JP); Takuya Kajiyama, Tokyo (JP); Toshiyuki Fujii, Tokyo (JP); Shigeo Hayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 208 days.

(21) Appl. No.: 17/921,845

(22) PCT Filed: Jun. 17, 2020

(86) PCT No.: PCT/JP2020/023807
§ 371 (c)(1),
(2) Date: Oct. 27, 2022

(87) PCT Pub. No.: WO2021/255866
PCT Pub. Date: Dec. 23, 2021

(65) Prior Publication Data
US 2023/0170822 A1 Jun. 1, 2023

(51) Int. Cl.
*H02M 7/483* (2007.01)
*H02M 1/00* (2006.01)
*H02M 7/219* (2006.01)

(52) U.S. Cl.
CPC ......... *H02M 7/219* (2013.01); *H02M 1/0009* (2021.05); *H02M 7/4833* (2021.05); *H02M 7/4835* (2021.05)

(58) Field of Classification Search
CPC ............. H02M 7/4833; H02M 7/4835; H02M 1/0009; H02M 7/219
See application file for complete search history.

(56) References Cited

U.S. PATENT DOCUMENTS

| 7,835,166 B2 | 11/2010 | Hiller |
| 2010/0067266 A1 | 3/2010 | Dommaschk et al. |

(Continued)

FOREIGN PATENT DOCUMENTS

| JP | 2011182517 A | 9/2011 |
| JP | 2019030106 A | 2/2019 |

OTHER PUBLICATIONS

International Search Report (PCT/ISA/210) with translation and Written Opinion (PCT/ISA/237) mailed on Sep. 8, 2020, by the Japan Patent Office as the International Searching Authority for International Application No. PCT/JP2020/023807. (8 pages).

(Continued)

*Primary Examiner* — Harry R Behm
(74) *Attorney, Agent, or Firm* — Buchanan Ingersoll & Rooney PC

(57) ABSTRACT

A power conversion device includes a power converter including a plurality of arms each having a plurality of converter cells connected to each other in cascade. Each converter cell includes a capacitor electrically connected to input/output terminals through a plurality of switching elements. A control device performs AC current control in accordance with a deviation between a detected AC current and an AC current command value and individual voltage control in accordance with a deviation between a voltage of each individual capacitor and an individual voltage command value. The control device calculates an evaluation value indicating the degree of variations in voltage of the individual capacitors. When the evaluation value is greater than a threshold value, the control device changes control of the power converter such that arm current flowing through each of the arms increases while the AC current control and the individual voltage control are being performed.

8 Claims, 22 Drawing Sheets

(56) References Cited

U.S. PATENT DOCUMENTS

2016/0336874 A1* 11/2016 Kikuchi ................ H02M 7/483
2018/0287509 A1* 10/2018 Fujii .................... H02M 7/4835
2020/0373851 A1* 11/2020 Wang ...................... H02M 1/15
2023/0006535 A1* 1/2023 Freijedo Fernández ....................
H02J 3/1857

OTHER PUBLICATIONS

Extended European Search Report dated Jun. 23, 2023, issued in the corresponding European Patent Application No. 20941189.1, 11 pages.
Hagiwara, et al., "Experiment and Simulation of a Modular Push-Pull PWM Converter for a Battery Energy Storage System", IEEE Transactions on Industry Applications, vol. 50, No. 2, Mar. 2014, pp. 1131-1140.
Communication pursuant to Article 94(3) EPC dated Mar. 15, 2024, issued in the corresponding European Patent Application No. 20941189.1, 7 pages.
Korn, et al., "Low Output Frequency Operation of the Modular Multi-level Converter", IEEE Energy Conversion Congress and Exposition, 2010, pp. 3993-3997.
Zhang, et al., "Analysis and Control of MMC-HVDC Under Unbalanced Voltage Conditions", Electric Power Systems Research, vol. 140, Jun. 4, 2016, pp. 528-538.
Summons to Attend Oral Proceedings Pursuant to Rule 115(1) EPC Feb. 4, 2025, issued in the corresponding European Patent Application No. 20941189.1, 8 pages.

* cited by examiner

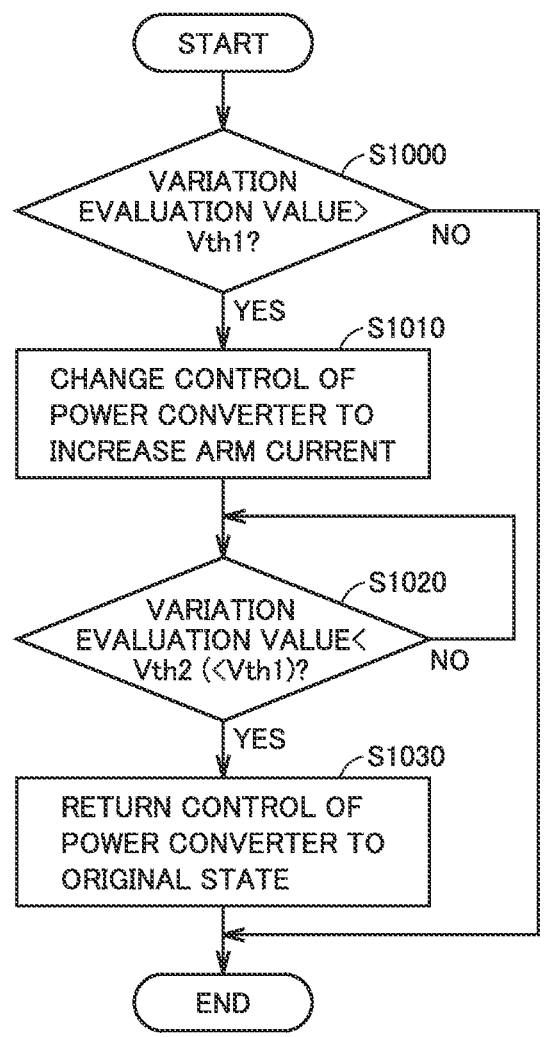

POWER CONVERSION DEVICE WITH INDIVIDUAL CELL AND ARM BALANCING

TECHNICAL FIELD

The present disclosure relates to a power conversion device.

BACKGROUND ART

Modular multilevel converters (MMCs) including a plurality of unit converters (hereinafter referred to as "converter cells") connected in cascade are known as large-capacity power conversion devices installed in power systems. Typically, a converter cell includes a plurality of switching elements and a power storage element (typically, capacitor).

In a modular multilevel converter, the voltage of a power storage element (capacitor voltage) of each individual converter cell need be maintained in the vicinity of a target value in order to obtain a desired control output. If the capacitor voltage falls out of the target value, the output voltage of the converter cell is not as instructed, so that the control characteristics may be deteriorated, for example, due to occurrence of not-intended circulating current. In a serious case, the capacitor voltage excessively rises or excessively lowers to the level of overvoltage protection or undervoltage protection in any converter cell, which may cause the MMC to stop operating.

The capacitor voltage is usually controlled in multi-hierarchy by capacitor voltage control of each individual converter cell (which hereinafter may be referred to as "individual control") as well as by control of converter cells as a whole in the MMC (which hereinafter may be referred to as "all voltage control") and balance control between certain groups (for example, arms or phases) (for example, see Japanese Patent Laying-Open No. 2011-182517 (PTL 1)).

The problem to be solved by Japanese Patent Laying-Open No. 2019-030106 (PTL 2) is unbalance in capacitor voltage caused by failure in stable individual control depending on a situation of an AC circuit when the MMC is connected to the AC circuit such as an AC power source and an AC load. Specifically, in the power conversion device described in this literature, in order to stably perform individual control, circulating current for individual control is fed in addition to circulating current for interphase balance control when AC power flowing in or flowing out between the AC circuit and the power converter is smaller than a threshold value.

CITATION LIST

Patent Literature

PTL 1: Japanese Patent Laying-Open No. 2011-182517
PTL 2: Japanese Patent Laying-Open No. 2019-030106

SUMMARY OF INVENTION

Technical Problem

Unbalance does not always occur between individual capacitor voltages when AC power input/output between the AC circuit and the power converter is smaller than a threshold value. The problem of the control method described in Japanese Patent Laying-Open No. 2019-030106 (PTL 2) above lies in that circulating current for individual control is always fed when AC power input/output between the AC circuit and the power converter is small. Because of this, unnecessary power may be consumed although variations of individual capacitor voltages fall within a permissible range.

The present disclosure is made in view of the problem described above and an object of the present disclosure is to provide an MMC-type power conversion device that can perform individual control of capacitor voltages more stably and efficiently.

Solution to Problem

A power conversion device according to an embodiment includes a power converter, an AC current detector, and a control device. The power converter includes a plurality of arms each having a plurality of converter cells connected to each other in cascade. Each of the arms is electrically connected to a corresponding phase of an AC circuit. Each of the converter cells includes a pair of input/output terminals, a plurality of switching elements, a power storage element electrically connected to the input/output terminals through the switching elements, and a voltage detector to detect a voltage of the power storage element. The AC current detector detects AC current flowing through an AC line connecting the AC circuit and the power converter. The control device controls the power converter. The control device includes an AC current controller, an individual voltage controller, and a control changer. The AC current controller performs AC current control in accordance with a deviation between the detected AC current and an AC current command value. The individual voltage controller performs individual voltage control in accordance with a deviation between a voltage of each individual power storage element and an individual voltage command value. The control changer calculates an evaluation value indicating a degree of variations in voltage of the power storage elements in the power converter as a whole, and when the evaluation value is greater than a threshold value, changes control of the power converter such that arm current flowing through each of the arms increases, while the AC current control and the individual voltage control are being performed.

Advantageous Effects of Invention

According to the present embodiment, when the evaluation value indicating a degree of variations in voltage of the power storage elements in the power converter as a whole is greater than a threshold value, control of the power converter is changed such that arm current flowing through each of the arms increases. As a result, individual control of capacitor voltages can be performed more stably and efficiently.

BRIEF DESCRIPTION OF DRAWINGS

FIG. 22 is a flowchart showing an operation example of a change instructor in FIG. 21.

DESCRIPTION OF EMBODIMENTS

Embodiments will be described in detail below with reference to the drawings. The same or corresponding parts are denoted by the same reference signs and a description thereof may be not repeated.

First Embodiment (Overall Configuration of Power Conversion Device)

Figure 1:
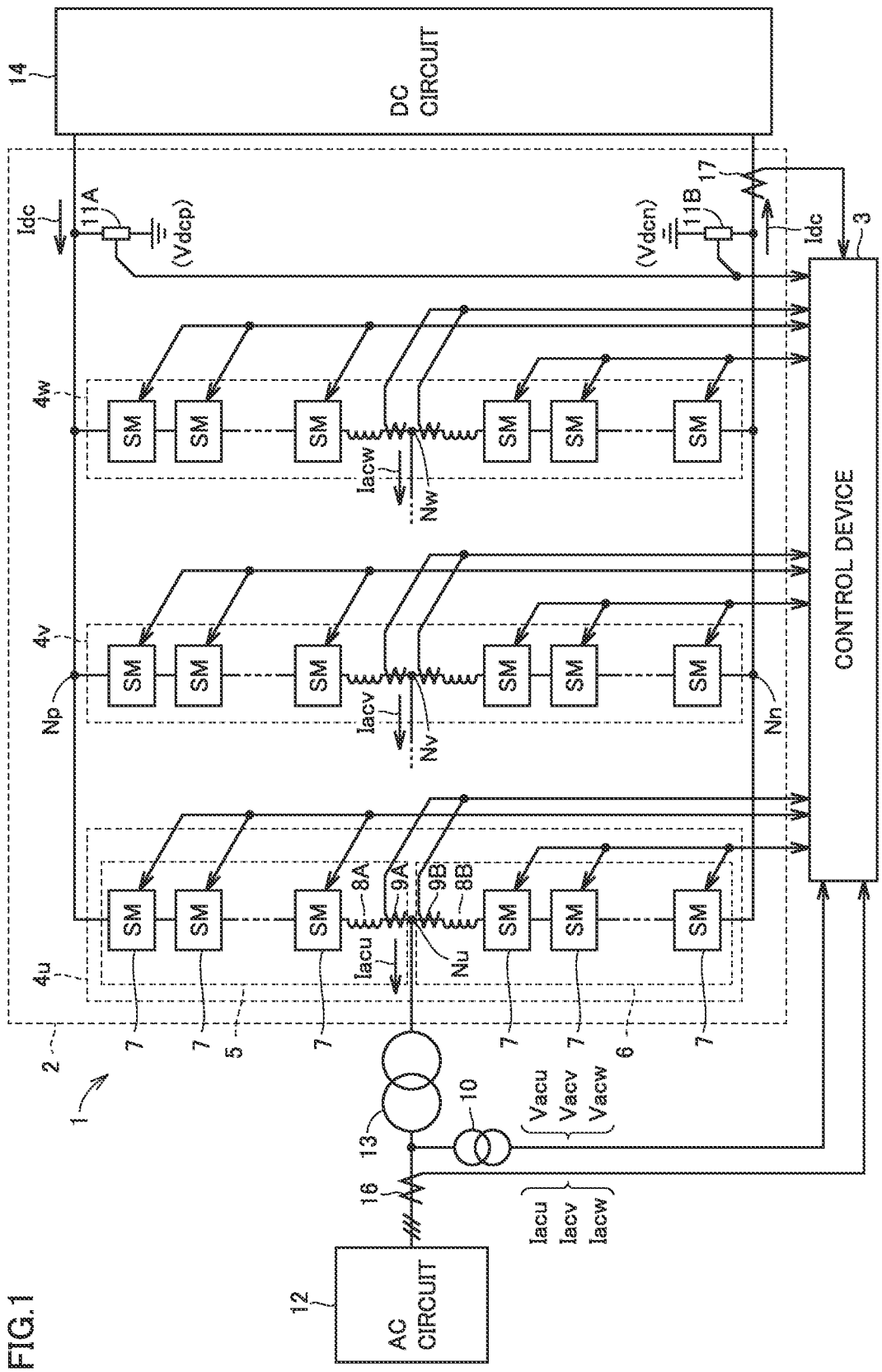
FIG. 1 is a schematic configuration diagram of a power conversion device 1 according to the present embodiment.

FIG. 1 is a schematic configuration diagram of a power conversion device 1 according to the present embodiment.

Referring to FIG. 1, power conversion device 1 is configured with a modular multilevel converter (MMC) including a plurality of converter cells connected in series to each other. The "converter cell" may be referred to as "submodule", SM, or "unit converter". Power conversion device 1 performs power conversion between a DC circuit 14 and an AC circuit 12. Power conversion device 1 includes a power converter 2 and a control device 3.

Power converter 2 includes a plurality of leg circuits 4u, 4v, and 4w (denoted as leg circuit 4 when they are collectively referred to or any one of them is referred to) connected in parallel with each other between a positive DC terminal (that is, high potential-side DC terminal) Np and a negative DC terminal (that is, low potential-side DC terminal) Nn.

Leg circuit 4 is provided for each of a plurality of phases forming alternating current. Leg circuit 4 is connected between AC circuit 12 and DC circuit 14 to perform power conversion between those circuits. In FIG. 1, AC circuit 12 is a three-phase alternating current system, and three leg circuits 4u, 4v, and 4w are provided respectively corresponding to U phase, V phase, and W phase.

AC input terminals Nu, Nv, and Nw respectively provided for leg circuits 4u, 4v, and 4w are connected to AC circuit 12 through a transformer 13. AC circuit 12 is, for example, an AC power system including an AC power source. In FIG. 1, for simplification of illustration, the connection between AC input terminals Nv, Nw and transformer 13 is not shown.

High potential-side DC terminal Np and low potential-side DC terminal Nn connected in common to leg circuits 4 are connected to DC circuit 14. DC circuit 14 is, for example, a DC power system including a DC power transmission network or a DC terminal of another power conversion device. In the latter case, two power conversion devices are coupled to form a back to back (BTB) system for connecting AC power systems having different rated frequencies.

AC circuit 12 may be connected through an interconnecting reactor, instead of using transformer 13 in FIG. 1. Furthermore, instead of AC input terminals Nu, Nv, and Nw, leg circuits 4u, 4v, and 4w may be provided with respective primary windings, and leg circuits 4u, 4v, and 4w may be connected in terms of alternating current to transformer 13 or the interconnecting reactor through secondary windings magnetically coupled to the primary windings. In this case, the primary windings may be reactors 8A and 8B described below. Specifically, leg circuits 4 are electrically (that is, in terms of direct current or alternating current) connected to AC circuit 12 through connections provided for leg circuits 4u, 4v, and 4w, such as AC input terminals Nu, Nv, and Nw or the primary windings.

Leg circuit 4u includes an upper arm 5 from high potential-side DC terminal Np to AC input terminal Nu and a lower arm 6 from low potential-side DC terminal Nn to AC input terminal Nu. AC input terminal Nu that is a connection point between upper arm 5 and lower arm 6 is connected to transformer 13. High potential-side DC terminal Np and low potential-side DC terminal Nn are connected to DC circuit 14. Leg circuits 4v and 4w have a similar configuration, and hereinafter the configuration of leg circuit 4u is explained as a representative example.

Upper arm 5 includes a plurality of converter cells 7 connected in cascade and a reactor 8A. Converter cells 7 and reactor 8A are connected in series. Similarly, lower arm 6 includes a plurality of converter cells 7 connected in cascade and a reactor 8B. Converter cells 7 and reactor 8B are connected in series. In the following description, the number of converter cells 7 included in each of upper arm 5 and lower arm 6 is denoted as Ncell. Ncell is ≥2.

Reactor 8A may be inserted at any position in upper arm 5 of leg circuit 4u, and reactor 8B may be inserted at any position in lower arm 6 of leg circuit 4u. A plurality of reactors 8A and a plurality of reactors 8B may be provided. The inductances of the reactors may be different from each other. Only reactor 8A of upper arm 5 or only reactor 8B of lower arm 6 may be provided. The transformer connection may be adjusted to cancel the magnetic flux of DC component current, and leakage reactance of the transformer may act on AC component current, as an alternative to the reactor. The provision of reactors 8A and 8B can suppress abrupt increase of accident current at a time of an accident in AC circuit 12 or DC circuit 14.

Power conversion device 1 further includes an AC voltage detector 10, an AC current detector 16, DC voltage detectors 11A and 11B, arm current detectors 9A and 9B provided for each leg circuit 4, and a DC current detector 17 as detectors for measuring the quantity of electricity (current, voltage, etc.) used in control. Signals detected by these detectors are input to control device 3.

In FIG. 1, the signal lines of signals input from the detectors to control device 3 and the signal lines of signals input and output between control device 3 and converter cells 7 are depicted partially collectively for the sake of ease of illustration, but, in actuality, they are provided individually for each detector and each converter cell 7. Signal lines between each converter cell 7 and control device 3 may be provided separately for transmission and reception. The signal lines are formed with, for example, optical fibers.

The detectors will now be specifically described.

AC voltage detector 10 detects U-phase AC voltage Vacu, V-phase AC voltage Vacv, and W-phase AC voltage Vacw of AC circuit 12. In the following description, Vacu, Vacv, and Vacw may be collectively referred to as Vac.

AC current detector 16 detects U-phase AC current Iacu, V-phase AC current Iacv, and W-phase AC current Iacw of AC circuit 12. In the following description, Iacu, Iacv, and Iacw may be collectively referred to as Iac.

DC voltage detector 11A detects DC voltage Vdcp at high potential-side DC terminal Np connected to DC circuit 14. DC voltage detector 11B detects DC voltage Vdcn at low potential-side DC terminal Nn connected to DC circuit 14. The difference between DC voltage Vdcp and DC voltage Vdcn is defined as DC voltage Vdc. DC current detector 17 detects DC current Idc flowing through high potential-side DC terminal Np or low potential-side DC terminal Nn.

Arm current detectors 9A and 9B provided in leg circuit 4u for U phase respectively detect upper arm current Ipu flowing through upper arm 5 and lower arm current Inu flowing through lower arm 6. Arm current detectors 9A and 9B provided in leg circuit 4v for V phase respectively detect upper arm current Ipv and lower arm current Inv. Arm current detectors 9A and 9B provided in leg circuit 4w for W phase respectively detect upper arm current Ipw and lower arm current Inw. In the following description, upper arm currents Ipu, Ipv, and Ipw may be collectively referred to as upper arm current Iarmp, lower arm currents Inu, Inv, and Inw may be collectively referred to as lower arm current Iarmn, and upper arm current Iarmp and lower arm current Iarmn may be collectively referred to as Iarm.

(Configuration Example of Converter Cell)

Figure 2:
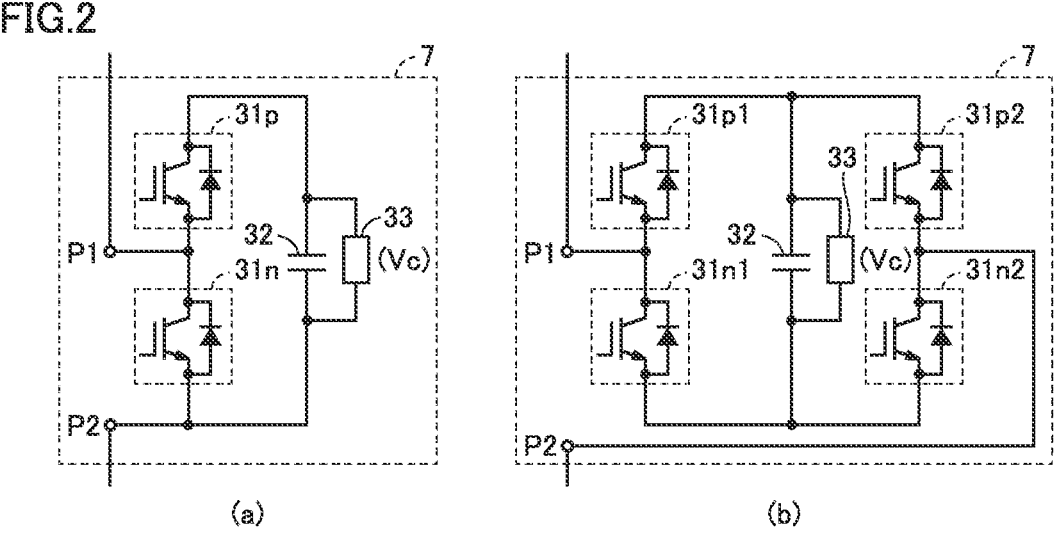
FIG. 2 is a circuit diagram showing a configuration example of a converter cell 7 that constitutes a power converter 2.

FIG. 2 is a circuit diagram showing a configuration example of converter cell 7 that constitutes power converter 2.

Converter cell 7 shown in FIG. 2(a) has a circuit configuration called half bridge configuration. This converter cell 7 includes a series of two switching elements 31p and 31n connected in series, a power storage element 32, a voltage detector 33, and input/output terminals P1 and P2. The series of switching elements 31p and 31n and power storage element 32 are connected in parallel. Voltage detector 33 detects voltage Vc between both ends of power storage element 32.

Both terminals of switching element 31n are connected to input/output terminals P1 and P2. With switching operation of switching elements 31p and 31n, converter cell 7 outputs voltage Vc of power storage element 32 or zero voltage between input/output terminals P1 and P2. When switching element 31p is turned ON and switching element 31n is turned OFF, voltage Vc of power storage element 32 is output from converter cell 7. When switching element 31p is turned OFF and switching element 31n is turned ON, converter cell 7 outputs zero voltage.

Converter cell 7 shown in FIG. 2(b) has a circuit configuration called full bridge configuration. This converter cell 7 includes a first series of two switching elements 31p1 and 31n1 connected in series, a second series of two switching elements 31p2 and 31n2 connected in series, a power storage element 32, a voltage detector 33, and input/output terminals P1 and P2. The first series, the second series, and power storage element 32 are connected in parallel. Voltage detector 33 detects voltage Vc between both ends of power storage element 32.

The middle point of switching element 31p1 and switching element 31n1 is connected to input/output terminal P1. Similarly, the middle point of switching element 31p2 and switching element 31n2 is connected to input/output terminal P2. With switching operation of switching elements 31p1, 31n1, 31p2, and 31n2, converter cell 7 outputs voltage Vc, −Vc of power storage element 32 or zero voltage between input/output terminals P1 and P2.

In FIG. 2(a) and FIG. 2(b), switching elements 31p, 31n, 31p1, 31n1, 31p2, and 31n2 are configured, for example, such that a freewheeling diode (FWD) is connected in anti-parallel with a self-turn-off semiconductor switching element such as an insulated gate bipolar transistor (IGBT) or a gate commutated turn-off (GCT) thyristor.

In FIG. 2(a) and FIG. 2(b), a capacitor such as a film capacitor is mainly used for power storage element 32. Power storage element 32 may hereinafter be called capacitor. In the following, voltage Vc of power storage element 32 may be referred to as capacitor voltage Vc.

As shown in FIG. 1, converter cells 7 are connected in cascade. In each of FIG. 2(a) and FIG. 2(b), in converter cell 7 arranged in upper arm 5, input/output terminal P1 is connected to input/output terminal P2 of adjacent converter cell 7 or high potential-side DC terminal Np, and input/output terminal P2 is connected to input/output terminal P1 of adjacent converter cell 7 or AC input terminal Nu. Similarly, in converter cell 7 arranged in lower arm 6, input/output terminal P1 is connected to input/output terminal P2 of adjacent converter cell 7 or AC input terminal Nu, and input/output terminal P2 is connected to input/output terminal P1 of adjacent converter cell 7 or low potential-side DC terminal Nn.

In the following, converter cell 7 has the half bridge cell configuration shown in FIG. 2(a), and a semiconductor switching element is used as a switching element, and a capacitor is used as a power storage element, by way of example. However, converter cell 7 that constitutes power converter 2 may have the full bridge configuration shown in FIG. 2(b). A converter cell having a configuration other than those illustrated in the examples above, for example, a converter cell having a circuit configuration called clamped double cell may be used, and the switching element and the power storage element are also not limited to the examples above.

(Control Device)

Figure 3:
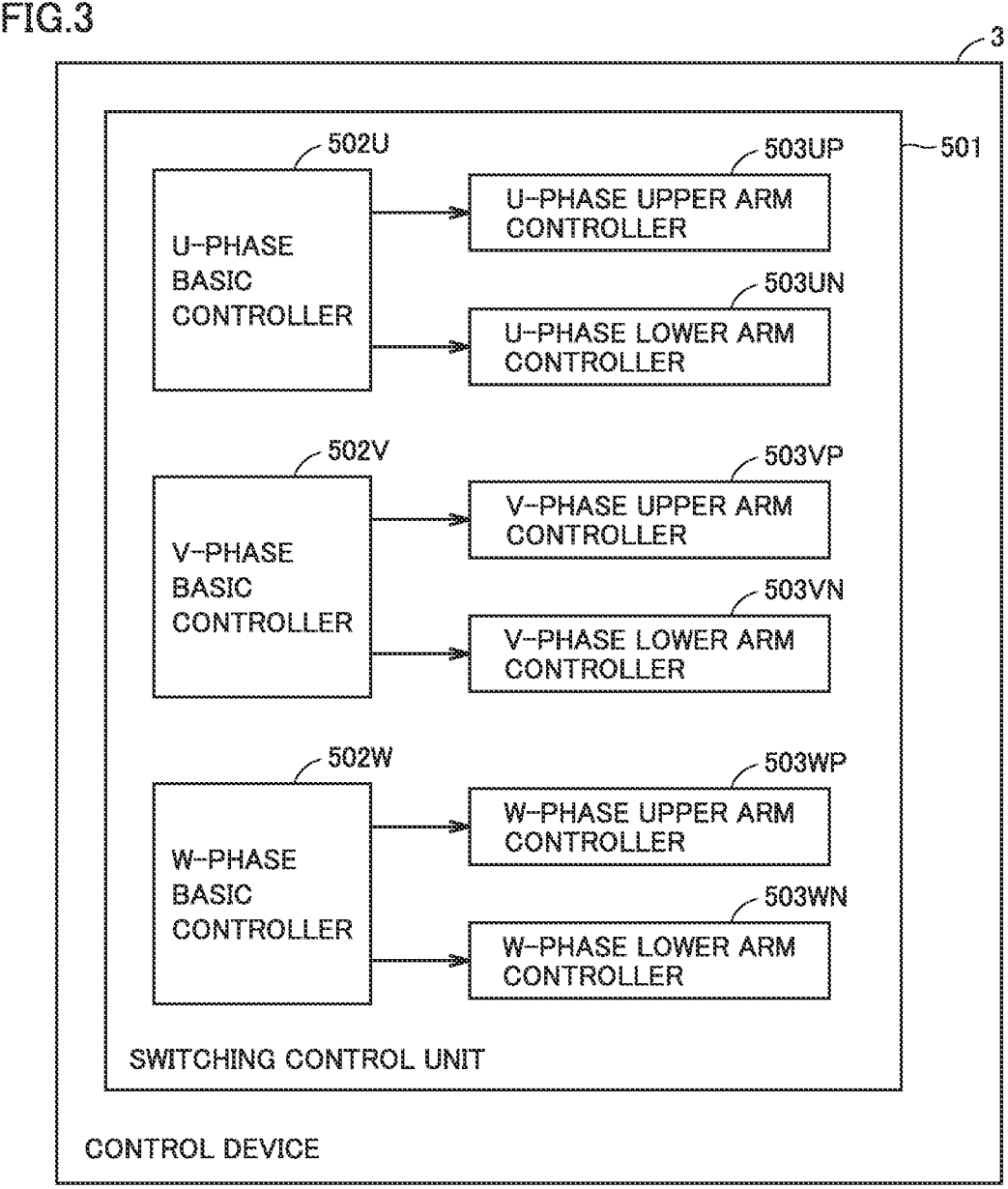
FIG. 3 is a functional block diagram illustrating an internal configuration of a control device 3 shown in FIG. 1.

FIG. 3 is a functional block diagram illustrating an internal configuration of control device 3 shown in FIG. 1.

Referring to FIG. 3, control device 3 includes a switching control unit 501 for controlling ON and OFF of switching elements 31p and 31n of each converter cell 7. Switching control unit 501 includes a U-phase basic controller 502U, a U-phase upper arm controller 503UP, a U-phase lower arm controller 503UN, a V-phase basic controller 502V, a V-phase upper arm controller 503VP, a V-phase lower arm controller 503VN, a W-phase basic controller 502W, a W-phase upper arm controller 503WP, and a W-phase lower arm controller 503WN.

In the following description, U-phase basic controller 502U, V-phase basic controller 502V, and W-phase basic controller 502W may be collectively referred to as basic controller 502. Similarly, U-phase upper arm controller 503UP, U-phase lower arm controller 503UN, V-phase upper arm controller 503VP, V-phase lower arm controller 503VN, W-phase upper arm controller 503WP, and W-phase lower arm controller 503WN may be collectively referred to as arm controller 503.

Figure 4:
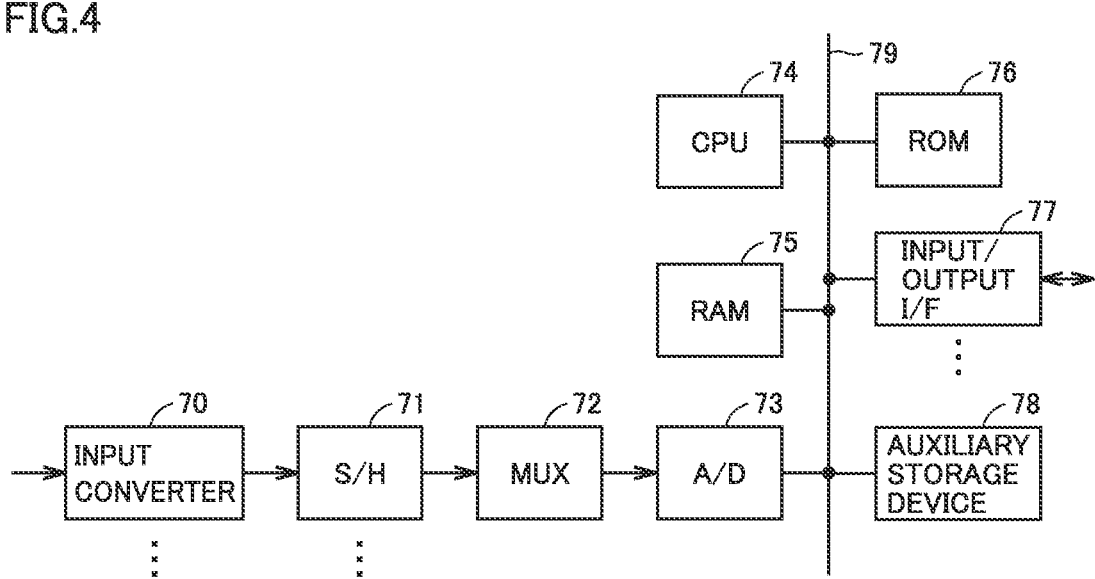
FIG. 4 is a block diagram showing a hardware configuration example of the control device.

FIG. 4 is a block diagram showing a hardware configuration example of the control device. FIG. 4 shows an example in which control device 3 is configured with a computer.

Referring to FIG. 4, control device 3 includes one or more input converters 70, one or more sample hold (S/H) circuits 71, a multiplexer (MUX) 72, and an analog-to-digital (A/D) converter 73. Control device 3 further includes one or more central processing units (CPU) 74, random access memory (RAM) 75, and read only memory (ROM) 76. Control device 3 further includes one or more input/output interfaces 77, an auxiliary storage device 78, and a bus 79 connecting the components above to each other.

Input converter 70 includes an auxiliary transformer (not shown) for each input channel. Each auxiliary transformer converts a detection signal from each electrical quantity detector in FIG. 1 into a signal having a voltage level suitable for subsequent signal processing.

Sample hold circuit 71 is provided for each input converter 70. Sample hold circuit 71 samples and holds a signal representing the electrical quantity received from the corresponding input converter 70 at a predetermined sampling frequency.

Multiplexer 72 successively selects the signals held by a plurality of sample hold circuits 71. A/D converter 73 converts a signal selected by multiplexer 72 into a digital value. A plurality of A/D converters 73 may be provided to perform A/D conversion of detection signals of a plurality of input channels in parallel.

CPU 74 controls the entire control device 3 and performs computational processing under instructions of a program. RAM 75 as a volatile memory and ROM 76 as a nonvolatile memory are used as a main memory of CPU 74. ROM 76 stores a program and setting values for signal processing. Auxiliary storage device 78 is a nonvolatile memory having a larger capacity than ROM 76 and stores a program and data such as electrical quantity detection values.

Input/output interface 77 is an interface circuit for communication between CPU 74 and an external device.

Unlike the example in FIG. 3, at least a part of control device 3 may be configured using circuitry such as a field programmable gate array (FPGA) and an application specific integrated circuit (ASIC). That is, the function of each functional block illustrated in FIG. 3 may be configured based on the computer illustrated in FIG. 4 or may be at least partially configured with circuitry such as an FPGA and an ASIC. At least a part of the function of each functional block may be configured with an analog circuit.

Figure 5:
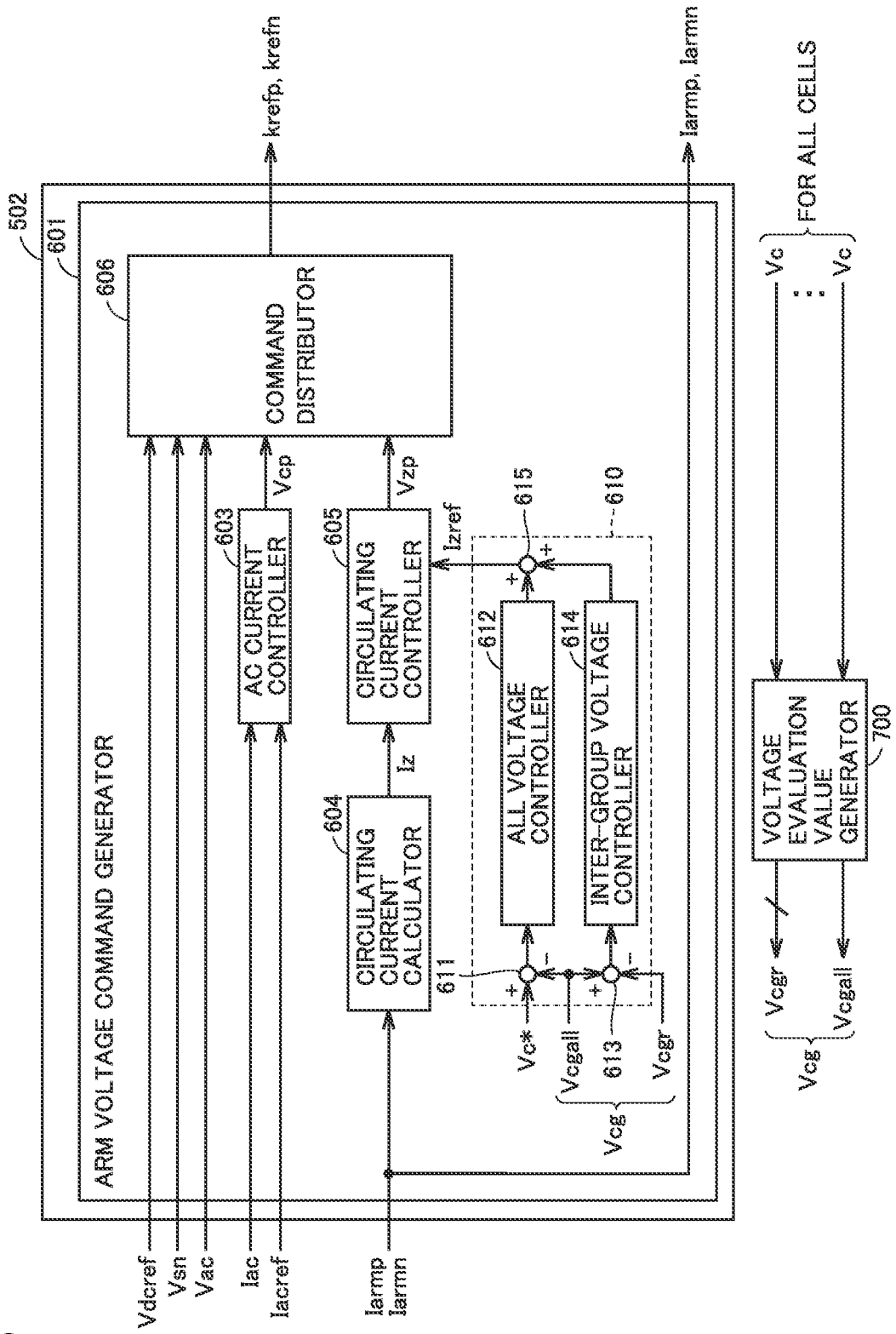
FIG. 5 is a block diagram illustrating a configuration example of a basic controller 502 shown in FIG. 3.

FIG. 5 is a block diagram illustrating a configuration example of basic controller 502 shown in FIG. 3.

Referring to FIG. 5, basic controller 502 includes an arm voltage command generator 601. Control device 3 further includes a voltage evaluation value generator 700 to generate a voltage evaluation value Veg to be used in arm voltage command generator 601.

Arm voltage command generator 601 calculates an arm voltage command value krefp for the upper arm and an arm voltage command value krefn for the lower arm. In the following description, krefp and krefn are collectively referred to as kref.

Voltage evaluation value generator 700 receives capacitor voltage Vc detected by voltage detector 33 in each converter cell 7. Voltage evaluation value generator 700 generates, from capacitor voltage Vc of each converter cell 7, an all voltage evaluation value Vcgall for evaluating the total sum of stored energy of capacitors 32 of all converter cells 7 in power converter 2 and a group voltage evaluation value Vcgr indicating the total sum of stored energy of capacitors 32 of converter cells 7 in each of predetermined groups.

For example, group voltage evaluation value Vcgr includes a U-phase voltage evaluation value Vcgu, a V-phase voltage evaluation value Vcgv, and a V-phase voltage evaluation value Vcgv for evaluating the total sum of stored energy of a plurality of (2×Necll) converter cells 7 included in each of leg circuits 4u (U phase), 4v (V phase), and 4w (W phase). Alternatively, instead of or in addition to the voltage evaluation value for each leg circuit 4 (U phase, V phase, W phase), group voltage evaluation value Vcgr may include group voltage evaluation value Vcgr for evaluating the total sum of stored energy of a plurality of (Necll) converter cells 7 for each of upper arm 5 and lower arm 6 for each leg circuit 4. In the present embodiment, all voltage evaluation value Vcgall and group voltage evaluation value Vcgr generated by voltage evaluation value generator 700 are collectively referred to as voltage evaluation value Vcg.

These voltage evaluation values Veg are determined as the mean value of capacitor voltages Vc of all of converter cells 7 in power converter 2 or the mean value of capacitor voltages Vc of a plurality of converter cells 7 belonging to each group (each phase leg circuit or each arm).

Arm voltage command generator 601 includes an AC current controller 603, a circulating current calculator 604, a circulating current controller 605, a command distributor 606, and a voltage macro controller 610.

AC current controller 603 calculates an AC control command value Vcp for reducing the deviation between the detected AC current Iac and the set AC current command value Iacref to zero. For example, AC current controller 603 may be configured as a PI controller that performs proportional computation and integral computation for the deviation or may be configured as a PID controller that additionally performs differential computation. Alternatively, AC current controller 603 may be configured using a configuration of another controller commonly used in feedback control.

As described later with reference to FIG. 19, in a fourth embodiment, a command value changer 630 for changing AC current command value Iacref is further provided in the AC current controller 603.

Circulating current calculator 604 calculates circulating current Iz flowing through one leg circuit 4, based on arm current Iarmp of the upper arm and arm current Iarmp of the lower arm. Circulating current is current circulating between a plurality of leg circuits 4. For example, circulating current Iz flowing through one leg circuit 4 can be calculated by the following equations (1) and (2).

$$Idc=(Ipu+Ipv+Ipw+Inu+Inv+Inw)/2 \quad (1)$$

$$Iz=(Iarmp+Iarmn)/2-Idc/3 \quad (2)$$

Voltage macro controller 610 generates a circulating current command value Izref so as to compensate for deficiency and excess of stored energy in all of converter cells 7 in power converter 2 and imbalance of stored energy between groups (between phase leg circuits or between arms), based on voltage evaluation value Vcg generated by voltage evaluation value generator 700.

For example, voltage macro controller 610 includes subtractors 611 and 613, an all voltage controller 612, an inter-group voltage controller 614, and an adder 615.

Subtractor 611 subtracts all voltage evaluation value Vcgall generated by voltage evaluation value generator 700 from all voltage command value Vc*. All voltage command value Vc* is a reference value of capacitor voltage Vc corresponding to a reference value of stored energy in capacitor 32 in each converter cell 7. All voltage controller 612 performs computation on the deviation of all voltage evaluation value Vcgall from all voltage command value Vc* calculated by subtractor 611 to generate a first current command value Izref1. First current command value Izref1 corresponds to a circulating current value for eliminating deficiency and excess of stored energy in all of converter cells 7 in power converter 2 by controlling the entire level of capacitor voltages Vc of converter cells 7 to all voltage command value Vc*.

Similarly, subtractor 613 subtracts group voltage evaluation value Vcgr from all voltage evaluation value Vcgall. For example, when basic controller 502 is U-phase basic controller 502, U-phase voltage evaluation value Vcgu is input as group voltage evaluation value Vcgr to subtractor 613. Inter-group voltage controller 614 performs computation on the deviation of group voltage evaluation value Vcgr (U-phase voltage evaluation value Vcgu) from all voltage evaluation value Vcgall calculated by subtractor 613 to generate a second current command value Izref2. Second current command value Izref2 corresponds to a circulating current value for eliminating imbalance of stored energy in converter cells 7 between groups by equalizing the level of capacitor voltages Vc of converter cells 7 between groups (here, between leg circuits of individual phases).

For example, all voltage controller 612 and inter-group voltage controller 614 may be configured as PI controllers that perform proportional computation and integral computation for the deviation calculated by subtractors 611 and 613 or may be configured as a PID controller that additionally performs differential computation. Alternatively, all voltage controller 612 and inter-group voltage controller 614 may be configured using a configuration of another controller commonly used in feedback control.

Adder 615 adds first current command value Izref1 from all voltage controller 612 to second current command value Izref2 from inter-group voltage controller 614 to generate circulating current command value Izref.

Circulating current controller 605 calculates a circulation control command value Vzp to perform control such that circulating current Iz calculated by circulating current calculator 604 follows circulating current command value Izref set by voltage macro controller 610. Circulating current controller 605 can also be configured with a controller that performs PI control or PID control for the deviation of circulating current Iz from circulating current command value Izref. That is, voltage macro controller 610 using voltage evaluation value Vcg forms a minor loop to control circulating current to suppress deficiency and excess of stored energy in all of converter cells 7 or a plurality of converter cells 7 in each group.

In the first embodiment, as described later with reference to FIG. 11, a command value changer 620 for changing circulating current command value Izref received from voltage macro controller 610 is further provided in circulating current controller 605.

Command distributor 606 receives AC control command value Vcp, circulation control command value Vzp, DC voltage command value Vdcref, neutral point voltage Vsn, and AC voltage Vac. Since the AC side of power converter 2 is connected to AC circuit 12 through transformer 13, neutral point voltage Vsn can be determined from the voltage of DC power source of DC circuit 14. DC voltage command value Vdcref may be given by DC output control or may be a constant value.

Command distributor 606 calculates voltage shares output by the upper arm and the lower arm, based on these inputs. Command distributor 606 determines arm voltage command value krefp of the upper arm and arm voltage command value krefn of the lower arm by subtracting a voltage drop due to an inductance component in the upper arm or the lower arm from the calculated voltage.

The determined arm voltage command value krefp of the upper arm and arm voltage command value krefn of the lower arm serve as output voltage commands to allow AC current Iac to follow AC current command value Iacref, allow circulating current Iz to follow circulating current command value Izref, allow DC voltage Vdc to follow DC voltage command value Vdcref, and perform feed forward control of AC voltage Vac. In this way, circulation control command value Vzp for allowing circulating current Iz to follow circulating current command value Izref is reflected in arm voltage command values krefp and krefn. That is, circulating current command value Izref calculated by voltage macro controller 610 or circulation control command value Vzp corresponds to an embodiment of "control value" set in common to Ncell converter cells 7 included in the same arm.

Basic controller 502 outputs arm current Iarmp of the upper arm, arm current Iarmn of the lower arm, arm voltage command value krefp of the upper arm, and arm voltage command value krefn of the lower arm.

Figure 6:
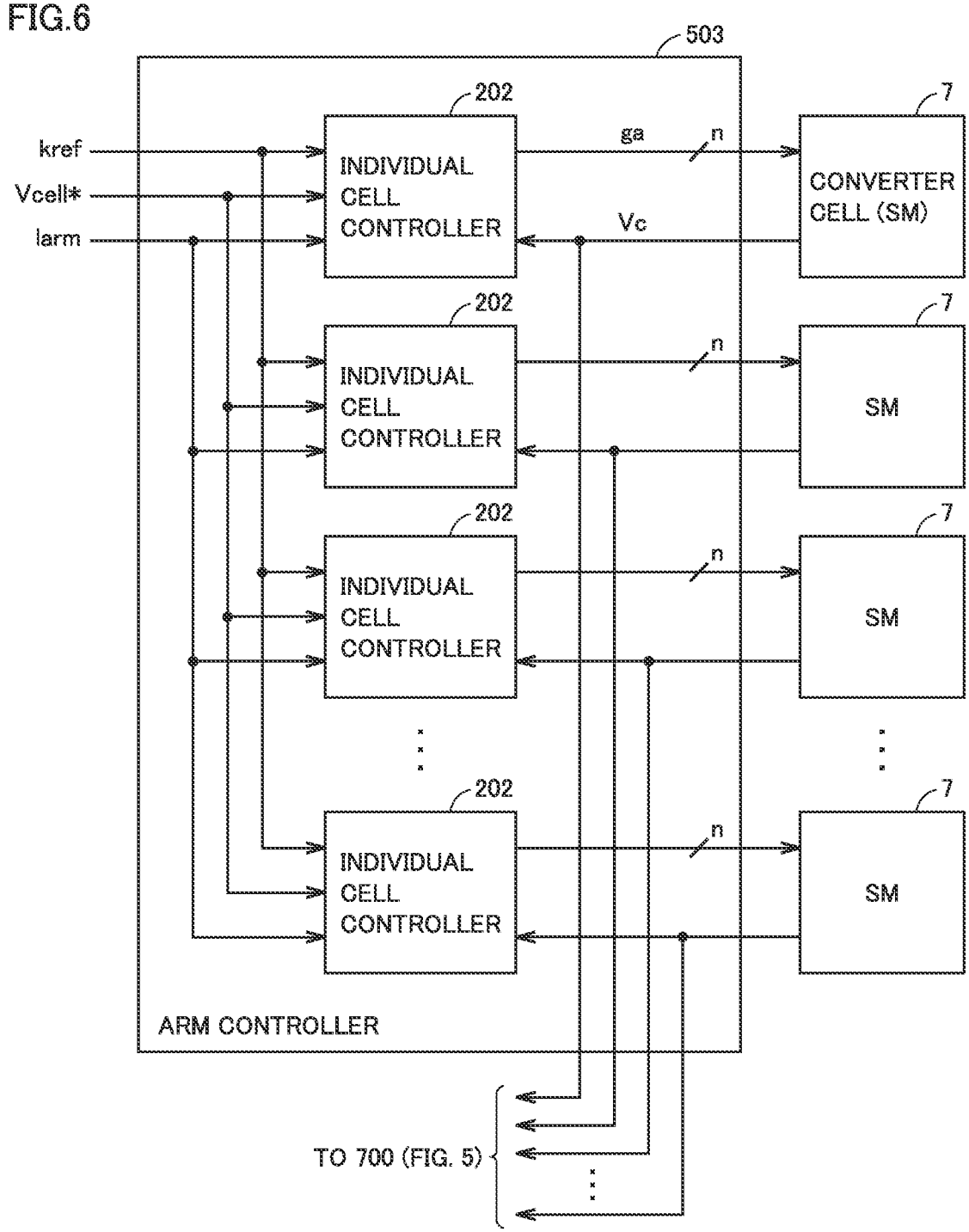
FIG. 6 is a block diagram illustrating a configuration example of an arm controller 503.

FIG. 6 is a block diagram illustrating a configuration example of arm controller 503.

Referring to FIG. 6, arm controller 503 includes Ncell individual cell controllers 202.

Each of individual cell controllers 202 individually controls the corresponding converter cell 7. Individual cell controller 202 receives arm voltage command value kref, arm current Iarm, and capacitor voltage command value Vcell* from basic controller 502. In the present disclosure, capacitor voltage command value Vcell* is referred to as individual voltage command value Vcell* or simply as voltage command value Vcell*.

Individual cell controller 202 generates a gate signal ga for the corresponding converter cell 7 and outputs the generated gate signal ga to the corresponding converter cell 7. Gate signal ga is a signal controlling ON and OFF of switching elements 31p and 31n in converter cell 7 in FIG. 2(a) (n=2). When converter cell 7 has the full bridge configuration in FIG. 2(b), the respective gate signals of switching elements 31p1, 31n1, 31p2, and 31n2 are generated (n=4). On the other hand, the detection value (capacitor voltage Vc) from voltage detector 33 in each converter cell 7 is sent to voltage evaluation value generator 700 shown in FIG. 5.

Figure 7:
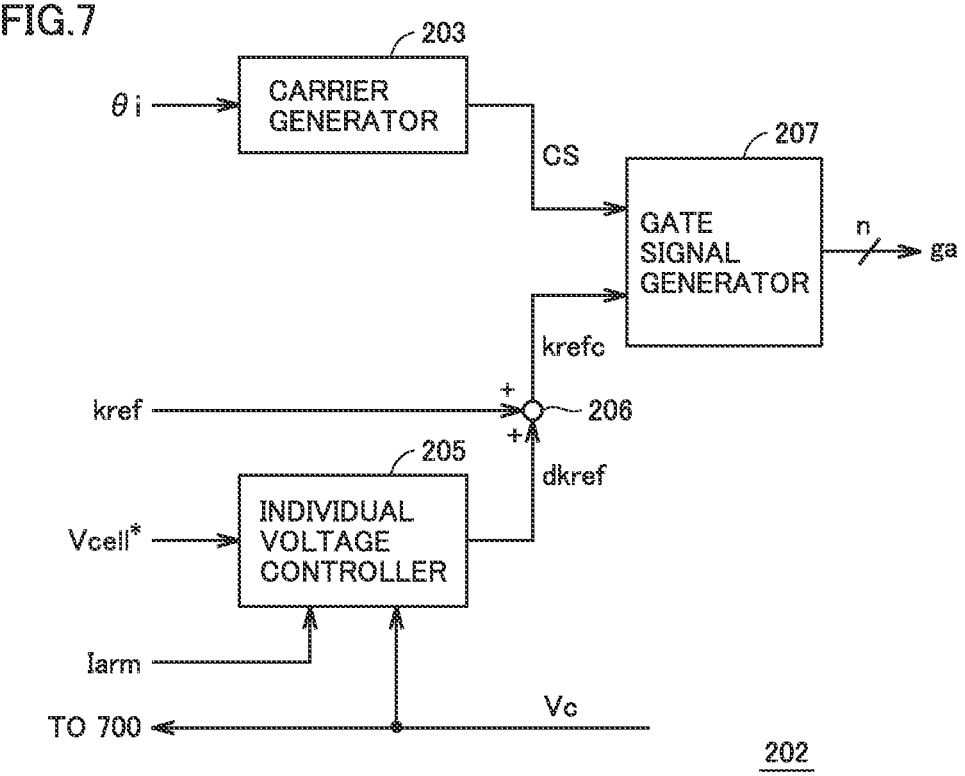
FIG. 7 is a block diagram showing a configuration example of an individual cell controller 202 shown in FIG. 6.

FIG. 7 is a block diagram showing a configuration example of individual cell controller 202 shown in FIG. 6.

Referring to FIG. 7, individual cell controller 202 includes a carrier generator 203, an individual voltage controller 205, an adder 206, and a gate signal generator 207.

Carrier generator 203 generates a carrier signal CS having a predetermined frequency (that is, carrier frequency) for use in phase shift pulse width modulation (PWM) control. The phase shift PWM control shifts the timings of PWM signals from each other to be output to a plurality of (Ncell) converter cells 7 that constitute the same arm (upper arm 5 or lower arm 6).

It is known that this can reduce harmonic components included in a synthesized voltage of output voltages of converter cells 7. For example, carrier generator 203 generates carrier signal CS having a phase shifted between Ncell converter cells 7, based on a common reference phase θi received from arm controller 503.

Individual voltage controller 205 receives voltage command value Vcell*, capacitor voltage Vc of the corresponding converter cell 7, and arm current of the arm to which the corresponding converter cell 7 belongs. Voltage command value Vcell* can be set to a value (fixed value) common to voltage command value Vc* of all voltage controller 612 in FIG. 5. Alternatively, in order to equalize capacitor voltage Vc in the same arm, voltage command value Vcell* may be set to the mean value of capacitor voltages of Ncell converter cells 7 included in the same arm.

Individual voltage controller 205 performs computation on the deviation of capacitor voltage Vc from voltage command value Vcell* to calculate a control output dkref for individual voltage control. Individual voltage controller 205 can also be configured with a controller that performs PI control or PID control. Furthermore, control output dkref for charging and discharging capacitor 32 in a direction that eliminates the deviation is calculated by multiplying the computed value by the controller by "+1" or "−1" in accordance with the polarity of arm current Iarm. Alternatively, control output dkref for charging and discharging capacitor 32 in a direction that eliminates the deviation may be calculated by multiplying the computed value by the controller by arm current Iarm.

Adder 206 adds arm voltage command value kref from basic controller 502 to control output dkref of individual voltage controller 205 and outputs a cell voltage command value krefc.

Gate signal generator 207 generates gate signal ga by performing PWM modulation of cell voltage command value krefc by carrier signal CS from carrier generator 203.

Figure 8:
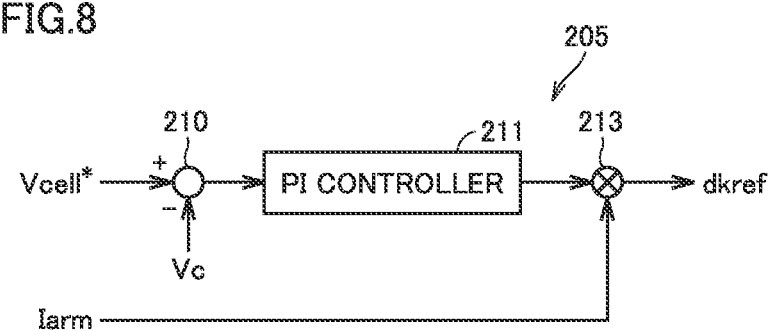
FIG. 8 is a block diagram showing a configuration example of an individual voltage controller in detail.

FIG. 8 is a block diagram showing a configuration example of the individual voltage controller in detail. Referring to FIG. 8, individual voltage controller 205 includes a subtractor 210, a PI controller 211, and a multiplier 213.

Subtractor 210 calculates a deviation of capacitor voltage Vc from voltage command value Vcell*. PI controller 211 performs proportional computation and integral computation for the deviation calculated by subtractor 210. Instead of PI controller 211, a PID controller that further performs differential computation or a feedback controller having another configuration may be used.

Multiplier 213 multiplies the computation result of PI controller 211 by arm current Iarm to generate control output dkref of individual voltage controller 205. Multiplier 213 may multiply the computation result of PI controller 211 by the sign "+1" or "−1" corresponding to the polarity of arm current Iarm, instead of arm current Iarm.

Figure 9:
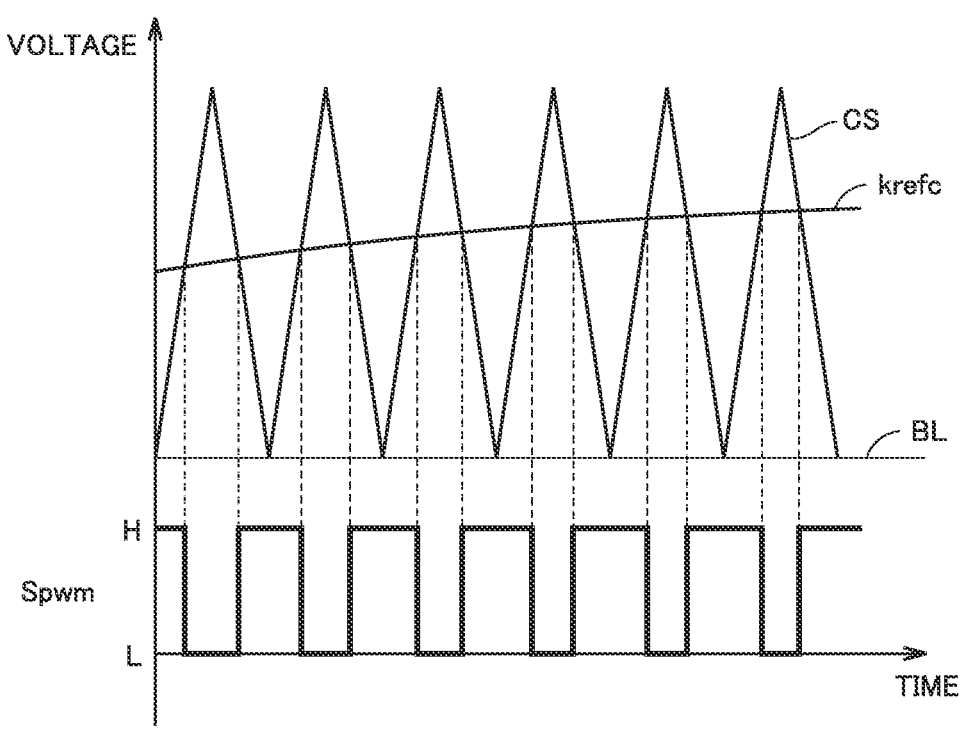
FIG. 9 is a conceptual waveform diagram for explaining PWM modulation control by a gate signal generator shown in in FIG. 7.

FIG. 9 is a conceptual waveform diagram for explaining PWM modulation control by the gate signal generator shown in in FIG. 7. The signal waveforms shown in FIG. 9 are exaggerated for explanation and do not illustrate actual signal waveforms as they are.

Referring to FIG. 9, cell voltage command value krefc is compared in voltage with carrier signal CS typically formed with triangular waves. When the voltage of cell voltage command value krefc is higher than the voltage of carrier signal CS, a PWM modulation signal Spwm is set to high level (H level). Conversely, when the voltage of carrier signal CS is higher than the voltage of cell voltage command value krefc, PWM modulation signal Spwm is set to low level (L level).

For example, in the H level period of PWM modulation signal Spwm, gate signal ga (n=2) is generated such that switching element 31p is turned ON and switching element 31n is turned OFF in converter cell 7 in FIG. 2(a). Conversely, in the L level period of PWM modulation signal Spwm, gate signal ga (n=2) is generated such that switching element 31n is turned ON and switching element 31p is turned OFF.

Gate signal ga is sent to a gate driver (not shown) of switching element 31p, 31n in converter cell 7, whereby ON and OFF of switching elements 31p and 31n in converter cell 7 is controlled.

Cell voltage command value krefc corresponds to a sinusoidal voltage corrected by control output dkref. In control device 3, therefore, a modulation ratio command value in PWM modulation can be calculated by a known method from the amplitude (or the effective value) of the sinusoidal voltage (arm voltage command value kref) and the amplitude of carrier signal CS.

In this way, it is understood that in the power conversion device according to the present embodiment, capacitor voltage Vc of converter cell 7 is controlled in multiple levels including individual control (individual voltage controller 205) for each converter cell 7 and macro control (voltage macro controller 610) for controlling the stored energy in the entire power converter 2 or a plurality of converter cells 7 in the same group (each phase leg circuit or arm).

(Cause of Variations in Capacitor Voltage in Individual Control)

Even when voltage macro controller 610 in FIG. 5 corrects deficiency and excess of stored energy in all of converter cells 7 in power converter 2 and imbalance in stored energy between groups (between phase leg circuits or between arms), the individual control in individual cell controller 202 sometimes does not function well and individual capacitor voltages Vc may vary. As a result, the capacitor voltage Vc of any converter cell 7 excessively rises or excessively lowers to the level of overvoltage protection or undervoltage protection, which may cause the MMC to stop operating.

As described above, one of the causes of variations of individual capacitor voltages Vc is that arm current Iarm is extremely small. For example, arm current Iarm is small when AC power input or output between AC circuit 12 and power conversion device 1 is small. Current flowing through individual converter cell 7 becomes small when arm current Iarm is small, so that current charged into power storage element 32 or discharged from power storage element 32 also becomes small. As a result, individual control does not work well and individual capacitor voltages Vc vary. If variations of individual capacitor voltages Vc are left, the variations may further increase.

In power conversion device 1 in the first embodiment, when variations of individual capacitor voltages Vc are great, power converter 2 is controlled such that circulating current is increased (that is, the absolute value of the circulating current command value is increased) while control by AC current controller 603 is performed. Thus, the effective value of current flowing through individual converter cell 7 can be increased without influencing the control of input/output of AC power between power converter 2 and AC circuit 12. As a result, the effectiveness of individual control is enhanced and variations of capacitor voltages Vc can be suppressed. The specifics will be described below with reference to FIG. 10 to FIG. 12.

(Configuration and Operation of Circulating Current Changer)

Figure 10:
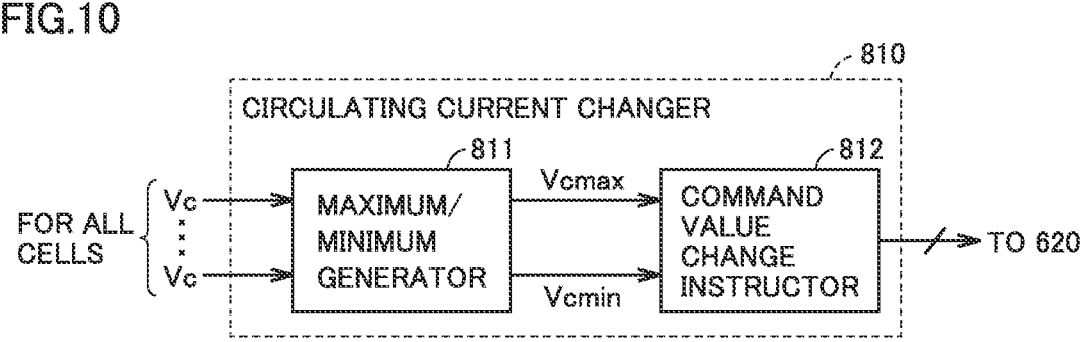
FIG. 10 is a block diagram showing a configuration example of a circulating current changer 810.

FIG. 10 is a block diagram showing a configuration example of a circulating current changer 810. Circulating current changer 810 is provided in control device 3. Circulating current changer 810 outputs an instruction to change circulating current command value Izref to circulating current controller 605.

As shown in FIG. 10, circulating current changer 810 includes a maximum/minimum generator 811 receiving capacitor voltage Vc detected by voltage detector 33 in each converter cell 7 and a command value change instructor 812. Maximum/minimum generator 811 determines maximum value Vcmax and minimum value Vcmin of capacitor voltages Vc of all of converter cells 7. When the difference between maximum value Vcmax and minimum value Vcmin is greater than a threshold value, command value change instructor 812 outputs an instruction to change circulating current command value Izref to command value changer 620 provided in circulating current controller 605.

Figure 11:
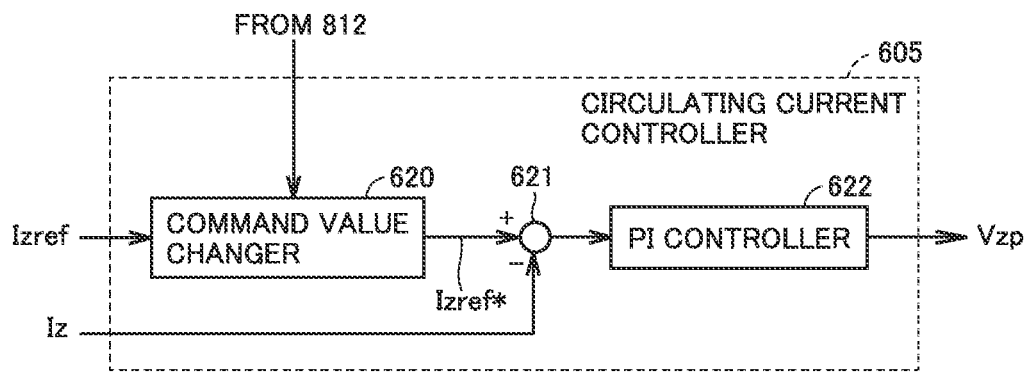
FIG. 11 is a block diagram showing a configuration example of a circulating current controller including the function of changing a circulating current command value.

FIG. 11 is a block diagram showing a configuration example of the circulating current controller including the function of changing a circulating current command value. Referring to FIG. 11, circulating current controller 605 includes a command value changer 620, a subtractor 621, and a PI controller 622. Circulating current controller 605 in FIG. 11 differs from circulating current controller 605 in FIG. 5 in that it further includes command value changer 620.

When an instruction to change circulating current command value Izref is received from command value change instructor 812 of circulating current changer 810, command value changer 620 adds the amount of change ΔIz to circulating current command value Izref input from voltage macro controller 610 and outputs the addition result as the final circulating current command value Izref* to subtractor 621. On the other hand, when an instruction to change circulating current command value Izref is not received from command value change instructor 812, command value changer 620 outputs the input circulating current command value Izref as it is as Izref* without change.

Subtractor 621 calculates a deviation between circulating current command value Izref* output from command value changer 620 and circulating current Iz calculated by circulating current calculator 604. PI controller 622 performs proportional computation and integral computation for the deviation calculated by subtractor 621. Instead of PI controller 622, a PID controller that further performs differential computation or a feedback computer having another configuration may be used. Circulating current controller 605 outputs the computation result of PI controller 622 as circulating control command value Vzp.

Figure 12:
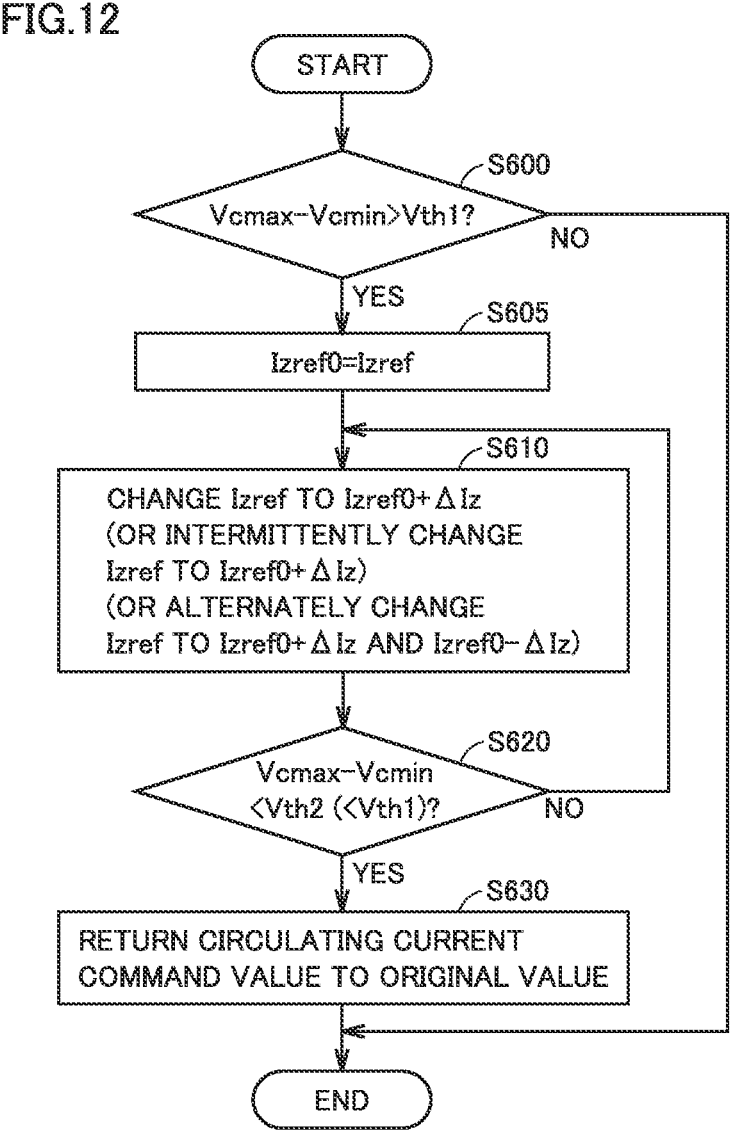
FIG. 12 is a flowchart showing the operation of a command value change instructor in FIG. 10.

FIG. 12 is a flowchart showing the operation of the command value change instructor in FIG. 10. Referring to FIG. 12, command value change instructor 812 operates when the difference between maximum value Vcmax and minimum value Vcmin of capacitor voltages Vc of all of converter cells 7 is greater than a threshold value Vth1 (YES at step S600). At the point of time when YES is determined at step S600, command value change instructor 812 stores circulating current command value Izref received from voltage macro controller 610 as Izref into a memory (step S605). In this case, command value change instructor 812 instructs command value changer 620 to change circulating current command value Izref received from voltage macro controller 610 to Izref0+ΔIz, that is, to increase the absolute value of circulating current command value Izref (step S610).

Circulating current controller 605 generates circulating control command value Vzp, based on the changed circulating current command value Izref0+ΔIz (=Izref*) and circulating current Iz calculated from arm current Iarm. Since arm voltage command value kref is generated based on the calculated circulating control command value Vzp, circulating current of each phase of power converter 2 increases as a consequence. Arm current Iarm can be increased by the amount of increase of circulating current.

Subsequently, when the difference between maximum value Vcmax and minimum value Vcmin of capacitor voltages Vc of all of converter cells 7 becomes smaller than a threshold value Vth2 (where Vth2<Vth1) (YES at step S620), command value change instructor 812 instructs command value changer 620 of circulating current controller 605 to return the circulating current command value changed at step S610 to the original value (step S630). If NO at step S620, step S610 is repeated.

(Modifications)

When circulating current is increased, the difference of capacitor voltage Vc between arms may become too large. Then, in order to eliminate the difference of capacitor voltage Vc between arms, changing of circulating current command value Izref described above may be performed intermittently. For example, command value change instructor 812 instructs command value changer 620 to alternately repeat changing circulating current command value Izref to Izref0+ΔIz, and keeping and not changing the original circulating current command value Izref0.

Alternatively, circulating current command value Izref may be set such that the direction to feed arm current Iarm is alternately changed. For example, command value change instructor 812 instructs command value changer 620 to alternately repeat adding the amount of change ΔIz to the original circulating current command value Izref0 and subtracting the amount of change ΔIz from the original circulating current command value Izref0.

Maximum/minimum generator 811 may determine the maximum value and the minimum value after applying a high cutoff filter on the time-series data of input capacitor voltage Vc of each converter cell 7.

Instead of the difference between maximum value Vcmax and minimum value Vcmin of capacitor voltages Vc, the variance or the standard deviation of capacitor voltages Vc of all of converter cells 7 may be used, and any evaluation value that represents the degree of variations can be used. Command value change instructor 812 therefore outputs, to command value changer 620, an instruction to change circulating current command value Izref input from voltage macro controller 610 to Izref0+ΔIz when the evaluation value representing the degree of variations is greater than a threshold value.

Effects of First Embodiment

As described above, in power conversion device 1 in the first embodiment, when variations of capacitor voltages Vc of individual converter cells 7 are great, circulating current command value Izref is set to a greater value. Thus, the effective value of arm current Iarm is increased by the amount of increase of circulating current, so that individual control functions more effectively. As a result, variations of individual capacitor voltages Vc can be suppressed.

Second Embodiment

In power conversion device 1 in a second embodiment, a phase modifier 801 is connected between AC circuit 12 and power converter 2. When variations of individual capacitor voltages Vc are great, reactive current is fed from power converter 2 to phase modifier 801 so that the effective value of arm current Iarm increases. This enhances the effectiveness of individual control, thereby suppressing variations of capacitor voltages Vc. The specifics will be described below with reference to FIG. 13 to FIG. 15.

Figure 13:
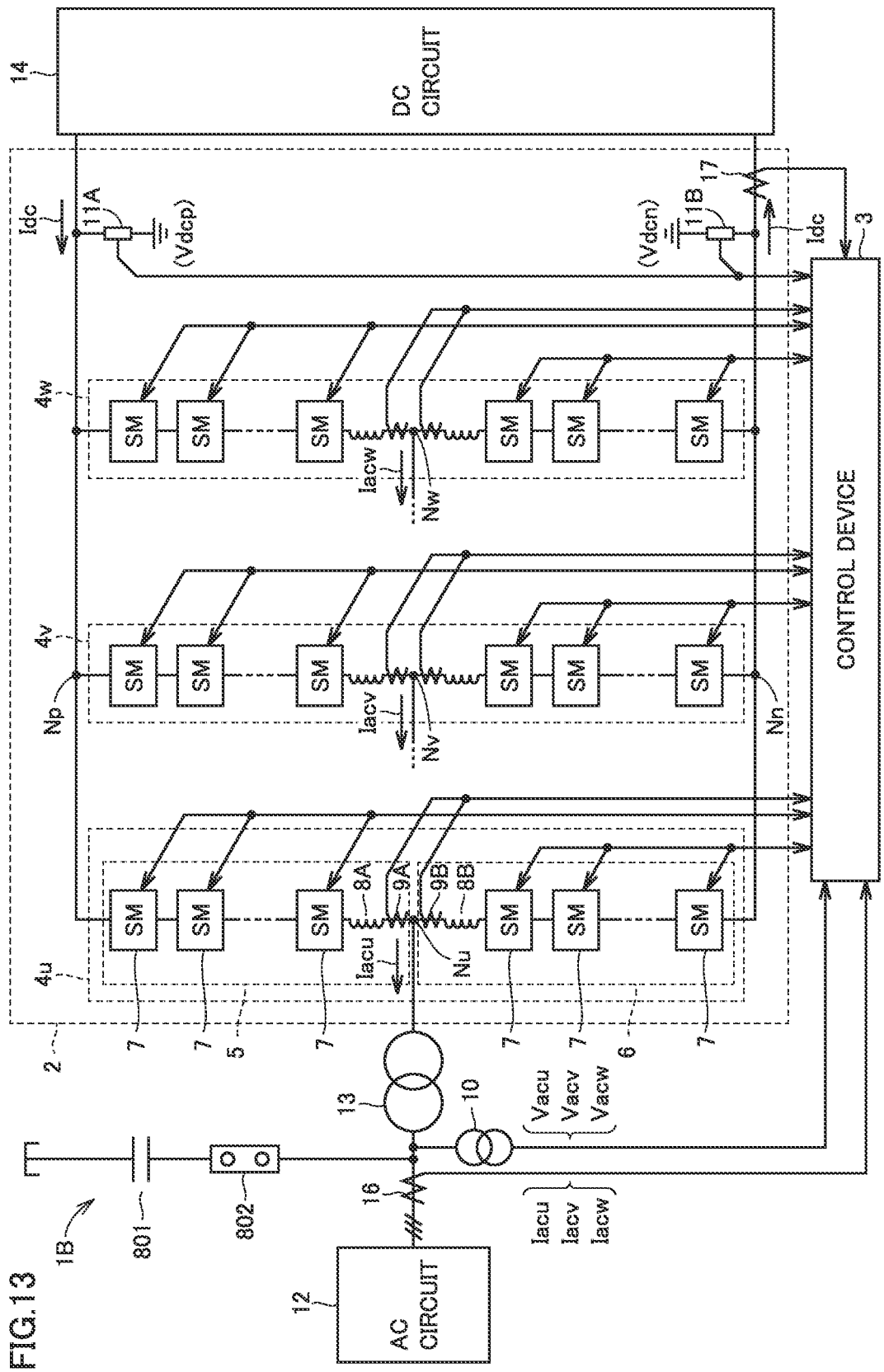
FIG. 13 is a schematic configuration diagram of a power conversion device in a second embodiment.

FIG. 13 is a schematic configuration diagram of the power conversion device in the second embodiment. Referring to FIG. 13, a power conversion device 1B in the second embodiment differs from power conversion device 1 in FIG. 1 in that phase modifier 801 is connected on an AC line between power converter 2 and AC circuit 12 through a switch 802.

Here, the connection position of switch 802 is between AC current detector 16 and transformer 13. Phase modifier 801 therefore allows reactive current to be output to power converter 2 but does not influence current control and voltage control of AC circuit 12.

Phase modifier 801 may be connected to the AC line by Y connection or may be connected by delta connection. FIG. 13 shows an example in which phase modifier 801 is capacitive and composed of a capacitor, a filter, and the like, but an inductive phase modifier such as a reactor may be employed. In the other respects, FIG. 13 is similar to FIG. 1 and the same or corresponding steps are denoted by the same reference signs and will not be further elaborated.

Figure 14:
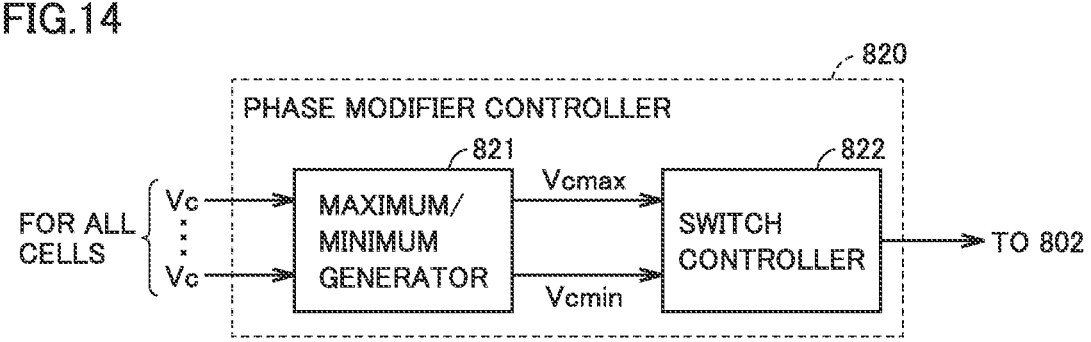
FIG. 14 is a block diagram showing a configuration example of a phase modifier controller to control the operation of a phase modifier in FIG. 13.

FIG. 14 is a block diagram showing a configuration example of a phase modifier controller to control the operation of the phase modifier in FIG. 13. A phase modifier controller 820 is provided in control device 3. Phase modifier controller 820 closes switch 802 in FIG. 13 to operate phase modifier 801 when variations of individual capacitor voltages Vc are great. As shown in FIG. 14, phase modifier controller 820 includes a maximum/minimum generator 821 and a switch controller 822.

Maximum/minimum generator 821 receives capacitor voltage Vc detected by voltage detector 33 in each converter cell 7. Maximum/minimum generator 821 determines maximum value Vcmax and minimum value Vcmin of capacitor voltages Vc of all of converter cells 7. Maximum/minimum generator 821 outputs information on the determined maximum value Vcmax and minimum value Vcmin to switch controller 822.

Figure 15:
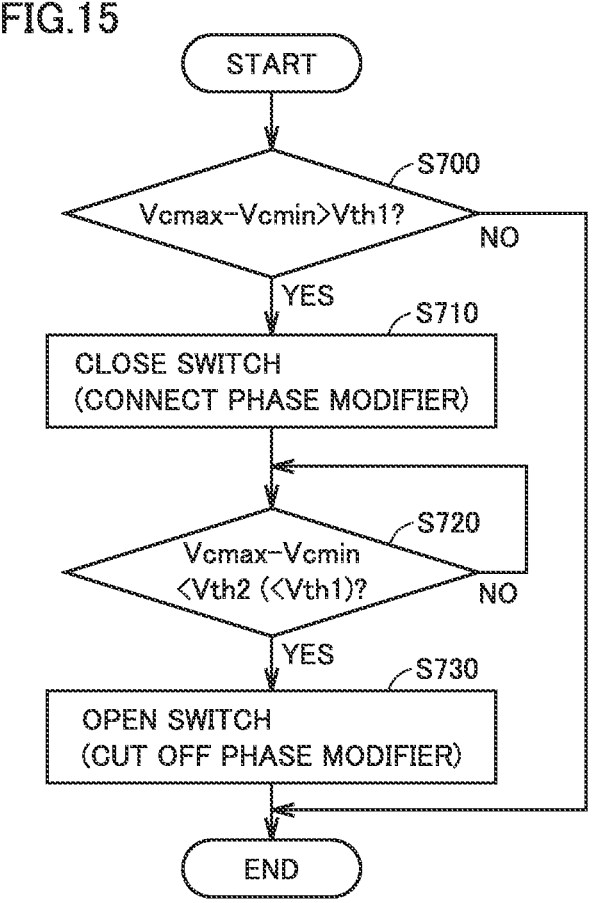
FIG. 15 is a flowchart showing an operation example of a switch controller in FIG. 14.

FIG. 15 is a flowchart showing an operation example of the switch controller in FIG. 14. Referring to FIG. 15, switch controller 822 operates when the difference between maximum value Vcmax and minimum value Vcmin of capacitor voltages Vc of all of converter cells 7 is greater than a threshold value Vth1 (YES at step S700). In this case, switch controller 822 closes switch 802 to connect phase modifier 801 to power converter 2 (step S710). Thus, reactive current flows from power converter 2 to phase modifier 801, so that arm current arm can be increased. As a result, individual control functions effectively, thereby suppressing variations of individual capacitor voltages Vc.

Subsequently, when the difference between maximum value Vcmax and minimum value Vcmin of capacitor voltages Vc of all of converter cells 7 becomes smaller than a threshold value Vth2 (where Vth2<Vth1) (YES at step S720), switch controller 822 opens switch 802 closed at step S710 to cut off phase modifier 801 from power converter 2 (step S730).

As described above, in power conversion device 1B in the second embodiment, when variations of capacitor voltages Vc of individual converter cells 7 are great, phase modifier 801 is electrically connected to power converter 2 to allow reactive current to flow through power converter 2. This increases the effective value of arm current Iarm and therefore enhances the effectiveness of individual control. Consequently, variations of individual capacitor voltages Vc can be suppressed.

At step S700 in FIG. 15, instead of the difference between maximum value Vcmax and minimum value Vcmin of capacitor voltages Vc, an evaluation value that represents the degree of variations of individual capacitor voltages Vc, such as the variance or the standard deviation of capacitor voltages Vc of all of converter cells 7, may be used.

Third Embodiment

In a power conversion device in a third embodiment, transformer 13 connected between AC circuit 12 and power converter 2 in FIG. 1 has the function of tap changing under an instruction from the outside. When variations of individual capacitor voltages Vc are great, the tap of transformer 13 is changed so that the transformer ratio of transformer 13 is changed. The specifics will be described below with reference to the drawings. The other hardware configuration of power conversion device 1 in FIG. 1 is applied to that of the third embodiment.

Figure 16:
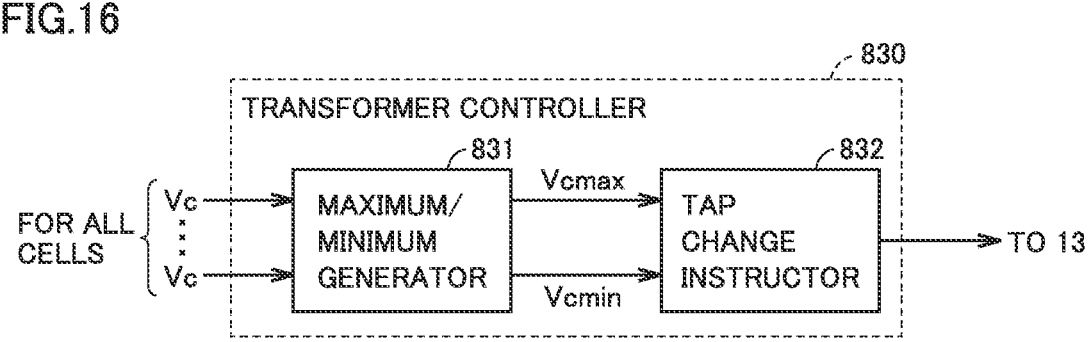
FIG. 16 is a block diagram showing a configuration example of a transformer controller for controlling tap changing of a transformer in FIG. 1.

FIG. 16 is a block diagram showing a configuration example of a transformer controller for controlling tap changing of the transformer in FIG. 1. A transformer controller 830 is provided in control device 3. As shown in FIG. 16, transformer controller 830 includes a maximum/minimum generator 831 and a tap change instructor 832.

Maximum/minimum generator 831 receives capacitor voltage Vc detected by voltage detector 33 in each converter cell 7. Maximum/minimum generator 831 determines maximum value Vcmax and minimum value Vcmin of capacitor voltages Vc of all of converter cells 7. Maximum/minimum generator 831 outputs information on the determined maximum value Vcmax and minimum value Vcmin to tap change instructor 832.

Figure 17:
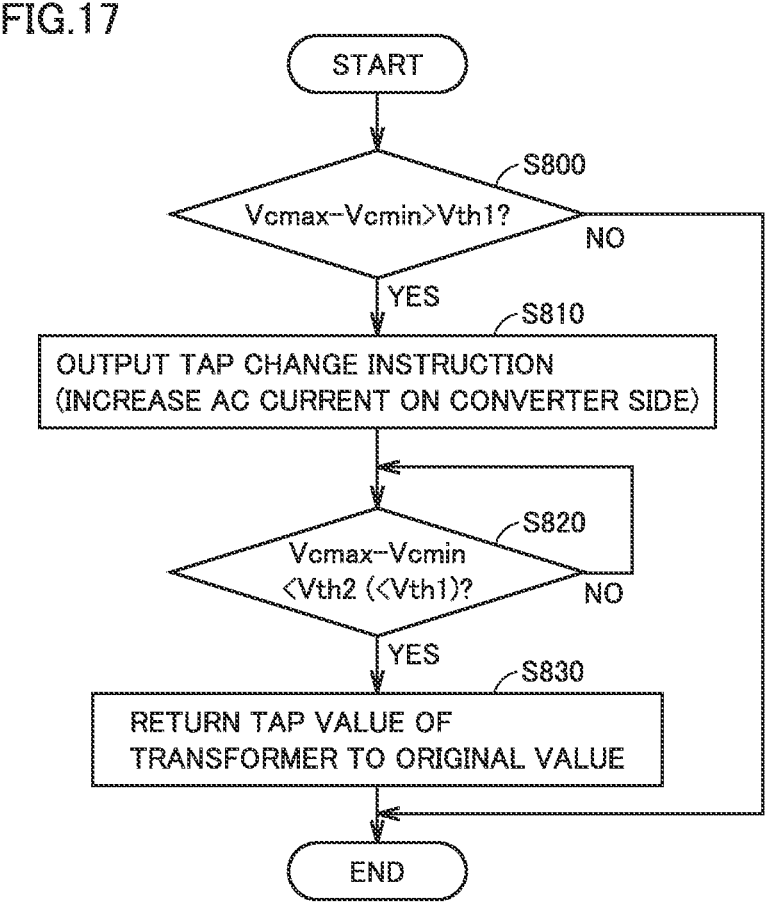
FIG. 17 is a flowchart showing an operation example of a tap change instructor in FIG. 16.

FIG. 17 is a flowchart showing an operation example of the tap change instructor in FIG. 16. Referring to FIG. 17, tap change instructor 832 operates when the difference between maximum value Vcmax and minimum value Vcmin of capacitor voltages Vc of all of converter cells 7 is greater than a threshold value Vth1 (YES at step S800). In this case, tap change instructor 832 outputs a tap change instruction to transformer 13 (step S810). Thus, the transformer ratio of transformer 13 is changed and the effective value of AC current on the power converter 2 side increases.

The increase of effective value of AC current Iac increases the effective value of arm current Iarm of power converter 2, thereby enhancing the effectiveness of individual control. As a result, variations of individual capacitor voltages Vc can be suppressed.

AC current controller 603 in power conversion device 1 performs control such that AC current Iac on the AC circuit 12 side is equal to AC current command value Iacref. Therefore, changing the transformer ratio of transformer 13 does not influence voltage control and current control on the AC circuit 12 side.

Subsequently, when the difference between maximum value Vcmax and minimum value Vcmin of capacitor voltages Vc of all of converter cells 7 becomes smaller than a threshold value Vth2 (where Vth2<Vth1) (YES at step S820), tap change instructor 832 instructs transformer 13 to return the tap of transformer 13 changed at step S810 to the original state (step S830).

As described above, in the power conversion device in the third embodiment, when variations of capacitor voltages Vc of individual converter cells 7 are great, the tap of transformer 13 provided between power converter 2 and AC circuit 12 is changed so that the transformer ratio of transformer 13 is changed. This can increase AC current on the power converter 2 side without influencing the AC circuit 12 side. As a result, arm current Iarm increases and the effectiveness of individual control is enhanced, thereby suppressing variations of individual capacitor voltages Vc.

At step S800 in FIG. 17, instead of the difference between maximum value Vcmax and minimum value Vcmin of capacitor voltages Vc, an evaluation value that represents the degree of variations of individual capacitor voltages Vc, such as the variance or the standard deviation of capacitor voltages Vc of all of converter cells 7, may be used.

Fourth Embodiment

In a power conversion device in a fourth embodiment, when variations of individual capacitor voltages Vc are great, a negative phase sequence current component is included in AC current supplied from power converter 2 to AC circuit 12. Thus, the effective value of AC current is increased by the amount of the negative phase sequence current component and the effective value of arm current also increases, so that individual control of capacitor voltage Vc functions effectively. The specifics will be described below with reference to the drawings. The configuration of power conversion device 1 in the first embodiment is basically applied to the fourth embodiment except for AC current controller 603.

Figure 18:
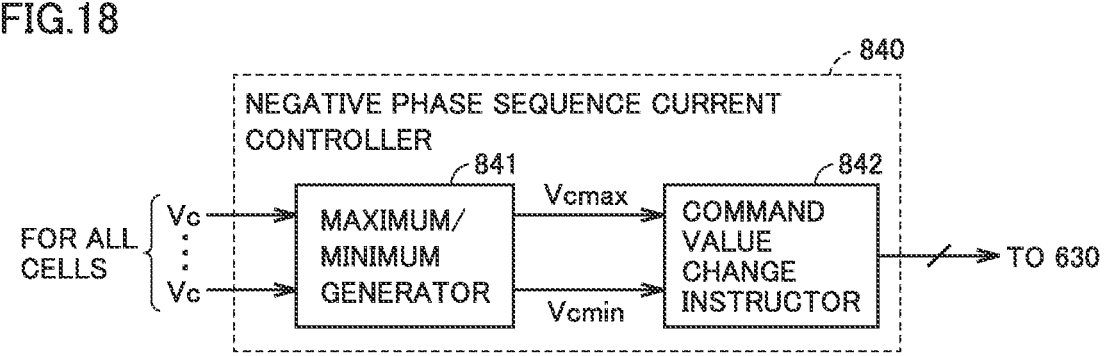
FIG. 18 is a block diagram showing a configuration example of a negative phase sequence current controller for controlling negative phase sequence current to be supplied from the power converter to a DC circuit.

FIG. 18 is a block diagram showing a configuration example of a negative phase sequence current controller for controlling negative phase sequence current to be supplied from the power converter to the DC circuit. A negative phase sequence current controller 840 is provided in control device 3. As shown in FIG. 18, negative phase sequence current controller 840 includes a maximum/minimum generator 841 and a command value change instructor 842.

Maximum/minimum generator 841 receives capacitor voltage Vc detected by voltage detector 33 in each converter cell 7. Maximum/minimum generator 841 determines maximum value Vcmax and minimum value Vcmin of capacitor voltages Vc of all of converter cells 7. When the difference between maximum value Vcmax and minimum value Vcmin is greater than a threshold value, command value change instructor 842 instructs command value changer 630 provided in AC current controller 603 to include a negative phase sequence current component in AC current command value Iacref within a prescribed range.

Figure 19:
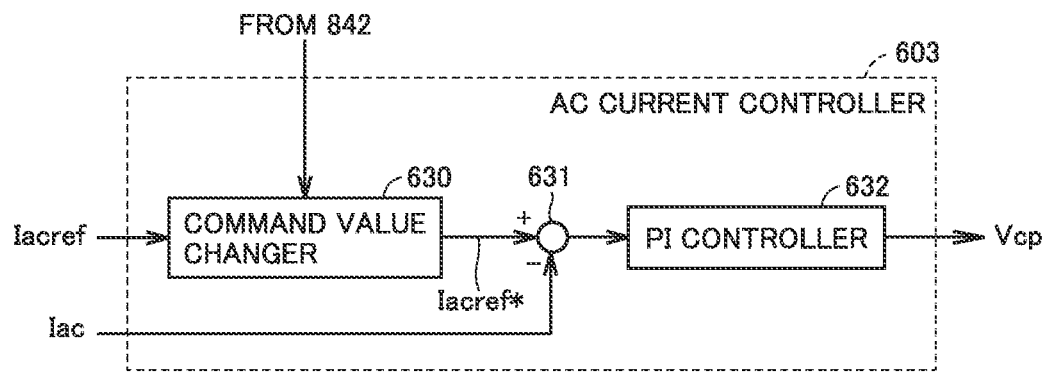
FIG. 19 is a block diagram showing a configuration example of an AC current controller in a power conversion device in a fourth embodiment.

FIG. 19 is a block diagram showing a configuration example of the AC current controller in the power conversion device in the fourth embodiment. Referring to FIG. 19, AC current controller 603 includes a command value changer 630, a subtractor 631, and a PI controller 632. AC current controller 603 in FIG. 19 differs from AC current controller 603 in FIG. 5 in that it further includes command value changer 630.

Command value changer 630 includes a negative phase sequence current component in AC current command value Iacref within a prescribed range when an instruction to change AC current command value Iacref is received from command value change instructor 842 of negative phase sequence current controller 840. Command value changer 630 then outputs the changed AC current command value Iacref* to subtractor 631. On the other hand, when an instruction to change AC current command value Iacref is not received from command value change instructor 842, command value changer 630 outputs the input AC current command value Iacref as it is as Iacref* without change.

Subtractor 631 calculates a deviation between AC current command value Iacref* output from command value changer 630 and the detected AC current Iac. PI controller 632 performs proportional computation and integral computation for the deviation calculated by subtractor 631. Instead of PI controller 632, a PID controller that further performs differential computation or a feedback computer having another configuration may be used. AC current controller 603 outputs the computation result of PI controller 632 as AC control command value Vcp.

Figure 20:
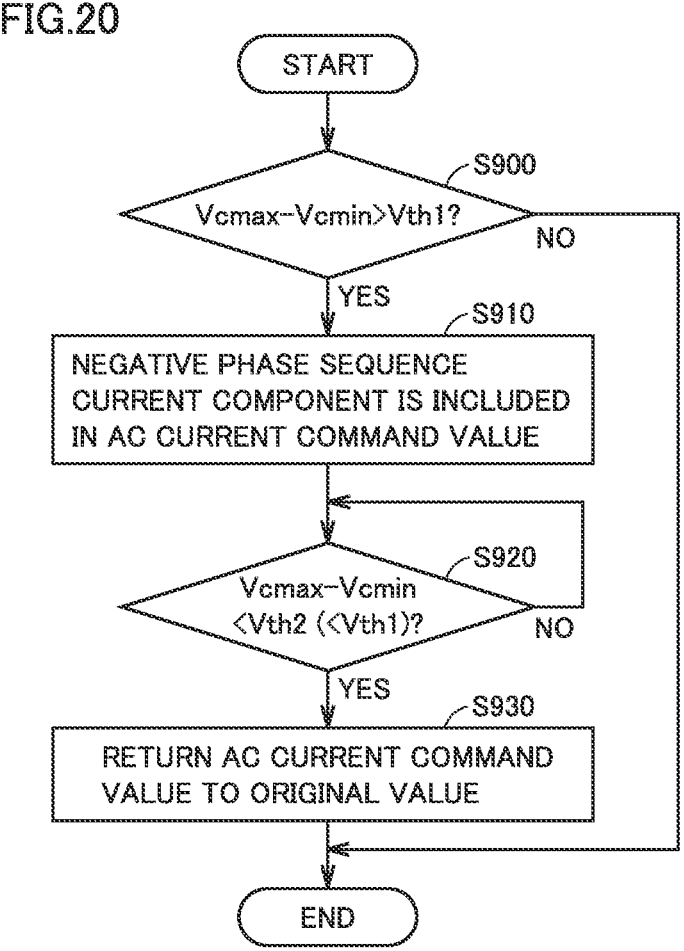
FIG. 20 is a flowchart showing an operation example of a command value change instructor in FIG. 18.

FIG. 20 is a flowchart showing an operation example of the command value change instructor in FIG. 18. Referring to FIG. 20, command value change instructor 842 operates when the difference between maximum value Vcmax and minimum value Vcmin of capacitor voltages Vc of all of converter cells 7 is greater than a threshold value Vth1 (YES at step S900). In this case, command value change instructor 842 instructs command value changer 630 of AC current controller 603 to include a negative phase sequence current component in AC current command value Iacref (step S910).

AC current controller 603 calculates AC control command value Vcp by performing computation by a feedback computer such as PI computer for the deviation between AC current command value Iacref* changed by command value changer 630 and the detected AC current Iac. Since arm voltage command value kref is generated based on the calculated AC control command value Vcp, AC current Iac including a negative phase sequence current component is output from power converter 2 to AC circuit 12. Thus, the effective value of arm current Iarm is increased by the amount of increase of the negative phase sequence current component, so that individual control functions more effectively, thereby suppressing variations of individual capacitor voltages Vc.

Subsequently, when the difference between maximum value Vcmax and minimum value Vcmin of capacitor voltages Vc of all of converter cells 7 becomes smaller than a threshold value Vth2 (where Vth2<Vth1) (YES at step S920), command value change instructor 842 instructs command value changer 630 of AC current controller 603 to return AC current command value Iacref changed at step S910 to the original value (step S930).

As described above, in the power conversion device in the fourth embodiment, when variations of capacitor voltages Vc of individual converter cells 7 are great, a negative phase sequence current component is included in AC current Iac supplied from power converter 2 to AC circuit 12. Thus, the effective value of AC current Iac increases by the amount of negative phase sequence current component, so that the effective value of arm current Iarm also increases. As a result, the effectiveness of individual control of capacitor voltages Vc is enhanced, so that variations of individual capacitor voltages Vc can be suppressed.

At step S900 in FIG. 20, instead of the difference between maximum value Vcmax and minimum value Vcmin of capacitor voltages Vc, an evaluation value that represents the degree of variations of individual capacitor voltages Vc, such as the variance or the standard deviation of capacitor voltages Vc of all of converter cells 7, may be used.

Fifth Embodiment

In a fifth embodiment, a more generalized form of the foregoing first to fourth embodiments will be described. The first to fourth embodiments can be combined as appropriate.

Figure 21:
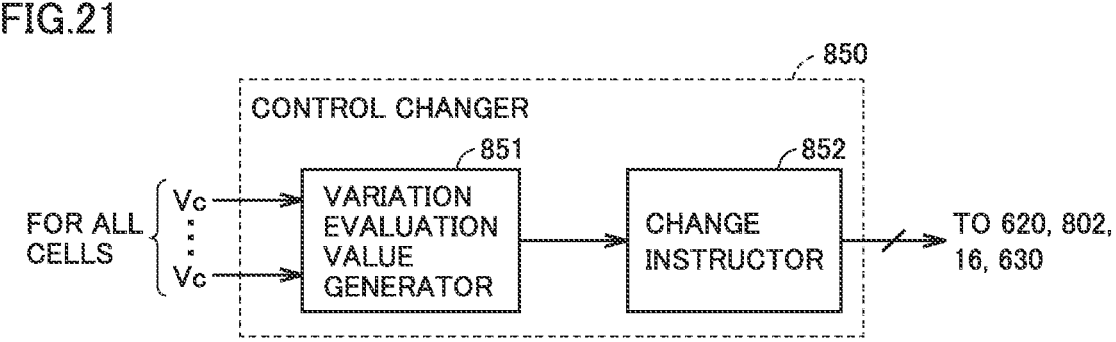
FIG. 21 is a block diagram showing a configuration example of a control changer that is a generalized form of the circulating current changer in FIG. 10, the phase modifier controller in FIG. 13, the transformer controller 830 in FIG. 15, and the negative phase sequence current controller in FIG. 17.

FIG. 21 is a block diagram showing a configuration example of a control changer that is a generalized form of the circulating current changer in FIG. 10, the phase modifier controller in FIG. 13, the transformer controller 830 in FIG. 15, and the negative phase sequence current controller in FIG. 17. A control changer 850 is provided in control device 3 to suppress variations of individual capacitor voltages. As shown in FIG. 21, control changer 850 includes a variation evaluation value generator 851 and a change instructor 852.

Variation evaluation value generator 851 corresponds to maximum/minimum generators 811, 821, 831, 841 in FIG. 10, FIG. 14, FIG. 16, and FIG. 18. Variation evaluation value generator 851 receives capacitor voltage Vc detected by voltage detector 33 in each converter cell 7 and generates an evaluation value representing the degree of variations of individual capacitor voltages Vc. The evaluation value is, for example, the difference between maximum value Vcmax and minimum value Vcmin, the variance, or the standard deviation.

Change instructor 852 corresponds to command value change instructor 812 in FIG. 10, switch controller 822 in FIG. 14, tap change instructor 832 in FIG. 16, and command value change instructor 842 in FIG. 18. When the evaluation value exceeds threshold value Vth1, change instructor 852 changes the control of power converter 2 to increase the effective value of arm current Iarm while AC control by AC current controller 603 in FIG. 5 and individual control of capacitor voltage Vc by individual voltage controller 205 in FIG. 7 are being performed. Thus, the effectiveness of individual control of capacitor voltages Vc is enhanced without influencing current control and voltage control of AC circuit 12, so that variations of individual capacitor voltages Vc can be suppressed.

FIG. 22 is a flowchart showing an operation example of the change instructor in FIG. 21. Referring to FIG. 22, change instructor 852 operates when the variation evaluation value of capacitor voltages Vc of all of converter cells 7 is greater than a threshold value Vth1 (YES at step S1000). In this case, change instructor 852 changes the control of power converter 2 to increase the effective value of arm current Iarm while AC control by AC current controller 603 in FIG. 5 and individual control of capacitor voltage Vc by individual voltage controller 205 in FIG. 7 (step S1010) are being performed.

Subsequently, when the variation evaluation value of capacitor voltages Vc of all of converter cells 7 becomes smaller than a threshold value Vth2 (where Vth2<Vth1) (YES at step S1020), change instructor 852 returns the control of power converter 2 to the original state (step S1020).

Embodiments disclosed here should be understood as being illustrative rather than being limitative in all respects. The scope of the subject application is shown not in the foregoing description but in the claims, and it is intended that all modifications that come within the meaning and range of equivalence to the claims are embraced here.

REFERENCE SIGNS LIST 1, 1B power conversion device, 2 power converter, 3 control device, 4 leg circuit, 5 upper arm, 6 lower arm, 7 converter cell, 9A, 9B arm current detector, 10 AC voltage detector, 11A, 11B DC voltage detector, 12 AC circuit, 13 transformer, 14 DC circuit, 16 AC current detector, 17 DC current detector, 31 switching element, 32 power storage element (capacitor), 33 voltage detector, 74 CPU, 202 individual cell controller, 203 carrier generator, 205 individual voltage controller, 207 gate signal generator, 211, 622, 632 PI controller, 501 switching controller, 502 basic controller, 503 arm controller, 601 arm voltage command generator, 603 AC current controller, 604 circulating current calculator, 605 circulating current controller, 606 command distributor, 610 voltage macro controller, 612 all voltage controller, 614 inter-group voltage controller, 620, 630 command value changer, 700 voltage evaluation value generator, 801 phase modifier, 802 switch, 810 circulating current changer, 811, 821, 831, 841 maximum/minimum generator, 812, 842 command value change instructor, 820 phase modifier controller, 822 switch controller, 830 transformer controller, 832 tap change instructor, 840 negative phase sequence current controller, 850 control changer, 851 variation evaluation value generator, 852 change instructor, Iacref AC current command value, Iac AC current, Iarm arm current, Iz circulating current, Izref circulating current command value, P1, P2 input/output terminal, Vac AC voltage, Vc* all voltage command value, Vc capacitor voltage, Vcell* individual voltage command value, Vcgall all voltage evaluation value, Vcgr group voltage evaluation value, Vcp AC control command value, Vth1, Vth2 threshold value, Vzp circulation control command value.

The invention claimed is:

1. A power conversion device comprising:
a power converter including a plurality of arms each having a plurality of converter cells connected to each other in cascade,
each of the arms being electrically connected to a corresponding phase of an AC circuit,
each of the converter cells including:
a pair of input/output terminals;
a plurality of switching elements;
a power storage element electrically connected to the input/output terminals through the switching elements; and
a voltage detector to detect a voltage of the power storage element, the power conversion device further comprising:
an AC current detector to detect AC current flowing through an AC line connecting the AC circuit and the power converter; and
a control device to control the power converter,
the control device including:

an AC current controller to perform AC current control in accordance with a deviation between the detected AC current and an AC current command value;

an individual voltage controller to perform individual voltage control in accordance with a deviation between a voltage of each individual power storage element and an individual voltage command value; and a control changer to calculate an evaluation value indicating a degree of variations in voltage of the power storage elements in the power converter as a whole, wherein when the evaluation value is greater than a threshold value, the control changer changes control of the power converter such that an effective value of arm current flowing through each of the arms increases as compared with when the evaluation value is not greater than the threshold, while the AC current control and the individual voltage control are being performed.

2. The power conversion device according to claim 1, further comprising a plurality of arm current detectors to detect respective arm currents flowing through the arms, wherein the control device further includes a circulating current controller to perform circulating current control in accordance with a deviation between circulating current calculated based on the detected arm currents and a circulating current command value calculated based on a mean value of voltages of the power storage elements in the converter cells, and when the evaluation value is greater than the threshold value, the control changer outputs, to the circulating current controller, an instruction to change an absolute value of the circulating current command value to a greater value.

3. The power conversion device according to claim 2, wherein when the evaluation value is greater than the threshold value, the control changer outputs, to the circulating current controller, an instruction to intermittently change an absolute value of the circulating current command value to a greater value.

4. The power conversion device according to claim 2, when the evaluation value is greater than the threshold value, the control changer outputs, to the circulating current controller, an instruction to alternately repeat adding an amount of change to an original circulating current command value and subtracting an amount of change from an original circulating current command value.

5. The power conversion device according to claim 1, further comprising a phase modifier connected to the AC line through a switch between the AC current detector and the power converter, wherein when the evaluation value is greater than the threshold value, the control changer outputs an instruction to close the switch.

6. The power conversion device according to claim 1, further comprising a transformer with a function of changing a tap, the transformer being connected between the AC current detector and the power converter, wherein when the evaluation value is greater than the threshold value, the control changer outputs an instruction to change the tap of the transformer to increase AC current on the power converter side.

7. The power conversion device according to claim 1, wherein when the evaluation value is greater than the threshold value, the control changer outputs, to the AC current controller, an instruction to change the AC current command value so as to include a negative phase sequence current component, and the AC current controller performs AC current control in accordance with a deviation between the detected AC current and the changed AC current command value.

8. A power conversion device comprising:

a power converter including a plurality of arms each having a plurality of converter cells connected to each other in cascade, each of the arms being electrically connected to a corresponding phase of an AC circuit, each of the converter cells including:
a pair of input/output terminals;
a plurality of switching elements;
a power storage element electrically connected to the input/output terminals through the switching elements; and
a voltage detector to detect a voltage of the power storage element, the power conversion device further comprising:

an AC current detector to detect AC current flowing through an AC line connecting the AC circuit and the power converter; and a control device to control the power converter,
the control device including:
an AC current controller to perform AC current control in accordance with a deviation between the detected AC current and an AC current command value;

an individual voltage controller to perform individual voltage control in accordance with a deviation between a voltage of each individual power storage element and an individual voltage command value; and a control changer to calculate an evaluation value indicating a degree of variations in voltage between the individual power storage elements, wherein when the evaluation value is greater than a threshold value, the control changer changes control of the power converter such that an effective value of arm current flowing through each of the arms increases as compared with when the evaluation value is not greater than the threshold, while performing the AC current control and the individual voltage control.

* * * * *